US012335969B2

(12) United States Patent
Oh et al.

(10) Patent No.: US 12,335,969 B2
(45) Date of Patent: Jun. 17, 2025

(54) METHOD AND APPARATUS FOR REPEATED TRANSMISSION AND RECEPTION IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Taehyoung Kim, Gyeonggi-do (KR); Sungjin Park, Gyeonggi-do (KR); Jeongho Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 481 days.

(21) Appl. No.: 17/765,703

(22) PCT Filed: Sep. 28, 2020

(86) PCT No.: PCT/KR2020/013202
§ 371 (c)(1),
(2) Date: Mar. 31, 2022

(87) PCT Pub. No.: WO2021/066449
PCT Pub. Date: Apr. 8, 2021

(65) Prior Publication Data
US 2022/0361231 A1    Nov. 10, 2022

(30) Foreign Application Priority Data
Oct. 2, 2019    (KR) .................. 10-2019-0122650

(51) Int. Cl.
*H04W 72/23* (2023.01)
*H04L 1/1607* (2023.01)
(Continued)

(52) U.S. Cl.
CPC ........... *H04W 72/23* (2023.01); *H04L 1/1642* (2013.01); *H04W 72/115* (2023.01); *H04W 72/1268* (2013.01)

(58) Field of Classification Search
CPC ............. H04W 72/23; H04W 72/1268; H04W 72/115; H04L 1/1642
See application file for complete search history.

(56) References Cited

U.S. PATENT DOCUMENTS 10,863,527 B2 * 12/2020 Kwon ................. H04W 72/046
2013/0300605 A1 * 11/2013 Celentano ............... H01Q 3/30
342/372

(Continued)

FOREIGN PATENT DOCUMENTS

KR    1020190046699    5/2019

OTHER PUBLICATIONS

MediaTek Inc., "On Uplink Inter-UE Transmission Prioritization and Multiplexing", R1-1908412, 3GPP TSG RAN1 WG1 Meeting #98, Aug. 26-30, 2019, 4 pages.

(Continued)

*Primary Examiner* — Raj Jain
(74) *Attorney, Agent, or Firm* — The Farrell Law Firm, P.C.

(57) ABSTRACT

The present disclosure relates to a method of a terminal in a wireless communication system. The method may include: determining a plurality of temporally sequential uplink transmission resources to repeatedly transmit a transmission block through configured grant-based uplink transmission; identifying a first uplink transmission resource corresponding to first initial transmission for the transmission block from among the determined plurality of uplink transmission resources; when the first initial transmission is cancelled, identifying a second uplink transmission resource corresponding to second initial transmission for the transmission block based on uplink transmission resource candidates following the identified first uplink transmission resource from among the plurality of uplink transmission resources;

(Continued)

and performing the second initial transmission through the identified second uplink transmission resource.

13 Claims, 12 Drawing Sheets

(51) Int. Cl.
  *H04W 72/115* (2023.01)
  *H04W 72/1268* (2023.01)

(56) References Cited

U.S. PATENT DOCUMENTS

| | | | |
|---|---|---|---|
| 2019/0044647 A1* | 2/2019 | Tomeba | H04L 5/0053 |
| 2019/0053211 A1 | 2/2019 | Ying et al. | |
| 2019/0253197 A1 | 8/2019 | Babaei et al. | |
| 2019/0254067 A1 | 8/2019 | Al-Imari et al. | |
| 2019/0274158 A1* | 9/2019 | Tang | H04L 5/0053 |
| 2020/0260442 A1 | 8/2020 | Yi | |
| 2020/0336248 A1* | 10/2020 | Bae | H04L 5/0055 |
| 2022/0210793 A1* | 6/2022 | Behravan | H04W 72/23 |
| 2022/0217765 A1* | 7/2022 | Bae | H04L 5/0048 |
| 2022/0361231 A1* | 11/2022 | Oh | H04W 72/1268 |

OTHER PUBLICATIONS

International Search Report dated Jan. 12, 2021 issued in counterpart application No. PCT/KR2020/013202, 16 pages.
Korean Office Action dated Mar. 30, 2025 issued in counterpart application No. 10-2019-0122650, 9 pages.

* cited by examiner

METHOD AND APPARATUS FOR REPEATED TRANSMISSION AND RECEPTION IN WIRELESS COMMUNICATION SYSTEM

PRIORITY

This application is a National Phase Entry of PCT International Application No. PCT/KR2020/013202, which was filed on Sep. 28, 2020, and claims priority to Korean Patent Application No. 10-2019-0122650, which was filed on Oct. 2, 2019, the entire content of each of which is incorporated herein by reference.

TECHNICAL FIELD

The present disclosure relates to a wireless communication system, and more particularly, to a method and apparatus for, when a terminal repeatedly transmits and receives an uplink/downlink signal or data channel in a wireless communication system, determining valid resources for repeated transmission and reception and properly performing uplink/downlink transmission and reception according to the valid resources.

BACKGROUND ART

In order to meet the increasing demand with respect to wireless data traffic after the commercialization of 4th generation (4G) communication systems, efforts have been made to develop enhanced 5th generation (5G) communication systems or pre-5G communication systems. For this reason, the 5G communication system or the pre-5G communication system is called a beyond 4G network communication system or a post-long term evolution (LTE) system. In order to achieve high data rates, the implementation of 5G communication systems in an ultra-high frequency millimeter-wave (mmWave) band (e.g., a 60-gigahertz (GHz) band) is being considered. In order to reduce pathloss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. Also, in order to improve networks of systems, for 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (COMP), and interference cancellation is underway. Furthermore, for 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter bank multi-carrier (FBMC), non-orthogonal multiple access (NOMA), or sparse code multiple access (SCMA), is underway.

The Internet has evolved from a human-based connection network, where humans create and consume information, to the Internet of things (IoT), where distributed elements such as objects exchange information with each other to process the information. Internet of Everything (IoE) technology, which is a combination of IoT technology and big data processing technology through connection with a cloud server, is also emerging. In order to implement the IoT, technology elements such as sensing technology, wired/wireless communication and network infrastructures, service interface technology, and security technology are required, and thus, technologies for inter-object connection, such as sensor network, machine to machine (M2M) communication, or machine-type communication (MTC), have recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Accordingly, various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology.

Also, in 5G communication systems, various technologies for improving the efficiency of data communication have been introduced, and one of the technologies involves supporting retransmission in units of code block groups.

DISCLOSURE

Technical Solution

The present disclosure provides a method and apparatus for, when a terminal repeatedly transmits and receives an uplink/downlink signal or data channel in a wireless communication system, determining valid resources for repeated transmission and reception and properly performing uplink/downlink transmission and reception according to the valid resources.

Advantageous Effects

According to an apparatus and method according to various embodiments of the present disclosure, when a terminal repeatedly transmits and receives an uplink/downlink signal or channel, valid resources for repeated transmission and reception may be determined, a method of performing uplink/downlink transmission and reception according to the valid resources may be provided, and thus, a base station and the terminal may more effectively communicate with each other.

The effects according to the present disclosure are not limited thereto, and throughout the specification it will be clearly appreciated by one of ordinary skill in the art that there may be other effects unmentioned.

BEST MODE

Figure 1:
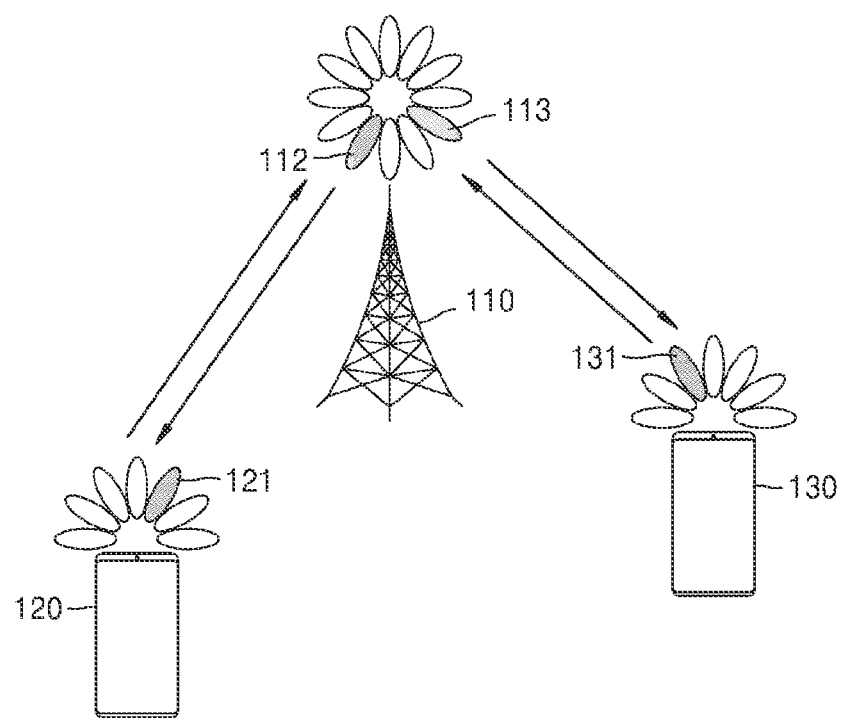
FIG. 1 is a diagram illustrating a wireless communication system, according to various embodiments of the present disclosure.

According to an embodiment of the present disclosure, a method of a terminal in a wireless communication system includes: determining a plurality of temporally sequential uplink transmission resources to repeatedly transmit a transmission block through configured grant-based uplink transmission; identifying a first uplink transmission resource corresponding to first initial transmission for the transmission block from among the determined plurality of uplink transmission resources; when the first initial transmission is cancelled, identifying a second uplink transmission resource corresponding to second initial transmission for the transmission block based on uplink transmission resource candidates following the identified first uplink transmission resource from among the plurality of uplink transmission resources; and performing the second initial transmission through the identified second uplink transmission resource.

According to an embodiment of the present disclosure, a terminal in a wireless communication system includes: a transceiver; and at least one processor configured to determine a plurality of temporally sequential uplink transmission resources to repeatedly transmit a transmission block through configured grant-based uplink transmission, identify a first uplink transmission resource corresponding to first initial transmission for the transmission block from among the determined plurality of uplink transmission resources, when the first initial transmission is cancelled, identify a second uplink transmission resource corresponding to second initial transmission for the transmission block based on uplink transmission resource candidates following the identified first uplink transmission resource from among the determined plurality of uplink transmission resources, and via the transceiver, perform the second initial transmission through the identified second uplink transmission resource.

MODE FOR INVENTION

Hereinafter, embodiments of the present disclosure will be described in detail with reference to the attached drawings. In the descriptions of the present disclosure, detailed explanations of the related art are omitted when it is deemed that they may unnecessarily obscure the essence of the present disclosure. The terms used herein are those defined in consideration of functions in the present disclosure, and may vary according to the intention of users or operators, precedents, etc. Hence, the terms used herein have to be defined based on the meaning of the terms together with the descriptions throughout the specification.

Advantages and features of the present disclosure and methods of accomplishing the same may be understood more readily by reference to the following detailed descriptions of embodiments and accompanying drawings of the present disclosure. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the present disclosure is defined only by the accompanying claims. In the specification, the same reference numerals denote the same elements.

Hereinafter, various embodiments of the present disclosure will be described in detail with reference to the accompanying drawings.

In the following description of embodiments of the present disclosure, descriptions of techniques that are well known in the art and not directly related to the present disclosure are omitted. This is to clearly convey the gist of the present disclosure by omitting an unnecessary description.

For the same reason, some elements in the attached drawings are exaggerated, omitted, or schematically illustrated. In addition, the size of each element may not substantially reflect its actual size. In the drawings, the same or corresponding elements are denoted by the same reference numerals.

Advantages and features of the present disclosure and methods of accomplishing the same may be understood more readily by reference to the following detailed descriptions of embodiments and accompanying drawings of the present disclosure. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the present disclosure is defined only by the accompanying claims. Throughout the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for implementing the functions specified in the flowchart block(s). Because these computer program instructions may also be stored in a computer-usable or computer-readable memory that may direct the computer or other programmable data processing equipment to function in a particular manner, the instructions stored in the computer-executable or computer-readable memory may produce an article of manufacture including instruction means for performing the functions specified in the flowchart block(s). Because the computer program instructions may also be loaded onto a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~ unit", as used in the present embodiment refers to a software or hardware component, such as field-programmable gate array (FPGA) or application-specific integrated circuit (ASIC), which performs certain tasks. However, the term "~ unit" does not mean to be limited to software or hardware. A "~ unit" may be configured to be in an addressable storage medium or may be configured to operate one or more processors. Thus, a "~ unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~ units" may be combined into fewer components and "~ units" or may be further separated into additional components and "~ units". Furthermore, components and "~ units" may be implemented to operate one or more central processing units (CPUs) in a device or a secure multimedia card. Also, a "~ unit" may include one or more processors in embodiments.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), and LTE-Advanced (LTE-A) of the $3^{rd}$ Generation Partnership Project (3GPP), high rate packet data (HRPD) and ultra mobile broadband (UMB) of 3GPP2, 802.16e of the Institute of Electrical and Electronic Engineers (IEEE), or the like. As a $5^{th}$ generation (5G) wireless communication system, 5G or new radio (NR) wireless communication systems are being established.

For the 5G communication system, various technologies may be introduced for providing various services and supporting a high data transmission rate, the various technologies including re-transmission in a code block group (CBG) unit, transmission of an uplink (UL) signal without uplink scheduling information (e.g., grant-free uplink transmission), or the like. In the wireless communication system including 5G, at least one service from among enhanced mobile broadband (eMBB), massive machine type communications (mMTC), and ultra-reliable and low-latency communications (URLLC) may be provided to a terminal. The services may be provided to the same terminal within the same time interval. In embodiments, the eMBB service may be for high-speed transmission of high-volume data, the mMTC service may be for minimization of power of the terminal and accesses by multiple terminals, and the URLLC service may be for high reliability and low latency, but the present disclosure is not limited thereto. The three services may be primary services in a wireless communication system such as an LTE system or a 5G or new radio/next radio (NR) system after the LTE system, but the present disclosure is not limited to the examples. Also, the aforementioned services in the 5G system are exemplary, and services that are available in the 5G system are not limited to the examples. A service providing the URLLC service may be referred to as a URLLC system, and a service providing the eMBB service may be referred to as an eMBB system. Also, the term "service" and the term "system" may be interchangeably or mixedly used.

Hereinafter, a base station is an entity that allocates resources to a terminal, and may include at least one of an evolved node B (eNode B), a Node B, a gNB, a base station (BS), a radio access unit, a BS controller, or a node on a network. A terminal may include at least one of a user equipment (UE), a mobile station (MS), a cellular phone, a smartphone, a computer, or a multimedia system capable of performing a communication function. In the present disclosure, a downlink (DL) is a radio transmission path of a signal transmitted from a BS to a UE, and an uplink (UL) is a radio transmission path of a signal transmitted from a UE to a BS. To describe a method and apparatus proposed in the present disclosure, the terms "physical channel" and "signal" in an LTE or LTE-A system or 5G system or new radio (NR) system according to the related art may be used. In general, a physical channel is used only when information of a higher layer than the physical layer (e.g., downlink/uplink shared channel) is transmitted, and a signal refers to a signal (e.g., a reference signal) transmitted and received only in the physical layer without transferring information to a higher layer. However, the terms "physical channel" and "signal" used herein may be interchangeably used, and may be distinguished or determined by one of ordinary skill in the art in the content proposed in the present disclosure.

Embodiments of the present disclosure may be applied to other communication systems having similar technical backgrounds or channel type as a mobile communication system described in the present disclosure. Embodiments of the present disclosure may be applied to other communication systems through modification at the discretion of one of ordinary skill in the art without greatly departing from the scope of the present disclosure.

The 5G or NR system, which is a representative example of the broadband wireless communication system, employs an orthogonal frequency division multiplexing (OFDM) scheme for a downlink (DL), and employs both the OFDM scheme and a single carrier frequency division multiple access (SC-FDMA) or DFT spread OFDM (DFT-s-OFDM) scheme for an uplink (UL). A multiple access scheme may identify data and control information for each user by allocating and operating time-frequency resources on which the data or the control information is to be carried for each user, so that the time-frequency resources do not overlap each other, that is, so that orthogonality is established.

The NR system has adopted a hybrid automatic repeat request (HARQ) scheme of retransmitting data at a physical layer when a decoding failure occurs in initial transmission. In the HARQ scheme, when a receiver does not accurately decode data, the receiver transmits information (negative acknowledgement (NACK)) indicating a failure in decoding to a transmitter in order to allow the transmitter to retransmit the data at the physical layer. The receiver may combine the data, which is retransmitted by the transmitter, with data previously failed in decoding, thereby increasing data reception performance. Also, according to the HARQ scheme, when the receiver accurately decodes the data, the receiver transmits decoding success indication information (e.g., acknowledgement (ACK)) to the transmitter in order to allow the transmitter to transmit new data.

In the description below, the term indicating a signal, the term indicating a channel, the term indicating control information, the term indicating a network entity, the term indicating a component of an apparatus, and the like are exemplified for convenience of explanation. Accordingly, the present disclosure is not limited to the terms described below, and other terms that refer to objects having equivalent technical meanings may be used.

Also, in the present disclosure, various embodiments will now be described by using terms and names defined in some communication standards (e.g., the 3GPP), but the present disclosure is not limited to the terms and names. Various embodiments of the present disclosure may be easily modified and applied to other communication systems.

Various embodiments of the present disclosure will now be described based on the NR system, but the present disclosure is applicable not only to the NR system but also applicable to various communication systems including LTE, LTE-A, LTE-A-Pro and 5G. While the present disclosure relates to a system and device for transmitting and receiving signals by using an unlicensed band, embodiments of the present disclosure may be applicable to a system that operates in a licensed band.

Hereinafter, in the present disclosure, higher layer signaling or a higher layer signal may refer to a method of transferring a signal transferred to a terminal from a BS using a downlink data channel of a physical layer or a signal transferred to the BS from the terminal using an uplink data channel of a physical layer, and may include at least one of radio resource control (RRC) signaling, packet data convergence protocol (PDCP) signaling, or a signal transfer scheme using a media access control element (MAC CE). Also, higher layer signaling or a higher layer signal may include a system information block (SIB) that is system information commonly transmitted to a plurality of terminals, and information other than master information block (MIB) from among information transmitted through a physical broadcast channel (PBCH) may also be included in the higher layer signal. In this case, the MIB may also be included in the higher layer signal. FIG. 1 illustrates a wireless communication system, according to various embodiments of the present disclosure. FIG. 1 illustrates a BS 110, a terminal 120, and a terminal 130, as parts of nodes using wireless channels in a wireless communication system. However, this is merely an example, and elements of the wireless communication system according to an embodiment of the present disclosure are not limited thereto. According to another example, although only one BS is illustrated in FIG. 1, another BS that is the same as or similar to the BS 110 may be further included.

The BS 110 refers to a network infrastructure providing radio access to the terminals 120 and 130. The BS 110 has coverage defined as a preset geographical region based on a range for transmitting a signal. The BS 110 may also be referred to as an access point (AP), eNodeB (eNB), gNodeB (gNB), $5^{th}$ generation (5G) node, wireless point, transmission/reception point (TRP), or another term having same technical meaning.

The terminal 120 and the terminal 130 may respectively refer to devices used by users and may perform communication with the BS 110 via the wireless channels. In some cases, at least one of the terminal 120 and the terminal 130 may operate without involvement of a user. That is, at least one of the terminal 120 and the terminal 130 may be a device for performing machine-type communication (MTC) and may not be carried by a user. The terminal 120 and the terminal 130 may each be referred to as, in addition to the terminal, a UE, a mobile station, a subscriber station, a remote terminal, a wireless terminal, a user device, or another term having an equivalent technical meaning.

A wireless communication environment may include wireless communication in an unlicensed band. The BS 110, the terminal 120, and the terminal 130 may transmit and receive a wireless signal in the unlicensed band (e.g., 5 to 7 GHZ and/or 64 to 71 GHz). In the unlicensed band, a cellular communication system and another communication system (e.g., a wireless local area network (WLAN)) may coexist. To ensure fairness between two communication systems, in other words, to prevent occurrence of a situation where a channel is exclusively used by one system, the BS 110, the terminal 120, and the terminal 130 may perform a channel access procedure for an unlicensed band. As an example of the channel access procedure for an unlicensed band, the BS 110, the terminal 120, and the terminal 130 may perform a "listen before talk (LBT)" procedure.

The BS 110, the terminal 120, and the terminal 130 may transmit and receive a wireless signal in a millimeter-wave (mmWave) band (e.g., 28 GHZ, 30 GHZ, 38 GHZ, and/or 60 GHz band). In this case, in order to increase a channel gain, the BS 110, the terminal 120, and the terminal 130 may perform beamforming. Here, the beamforming may include transmission beamforming and reception beamforming. That is, the BS 110, the terminal 120, and the terminal 130 may apply directivity to a transmission signal or a reception signal. To this end, the BS 110 and the terminals 120 and 130 may select serving beams via a beam search procedure or a beam management procedure. After the serving beams are selected, communication thereafter may be performed using a resource in a quasi co-located (QCL) relation with a resource that transmitted the serving beams.

Figure 2:
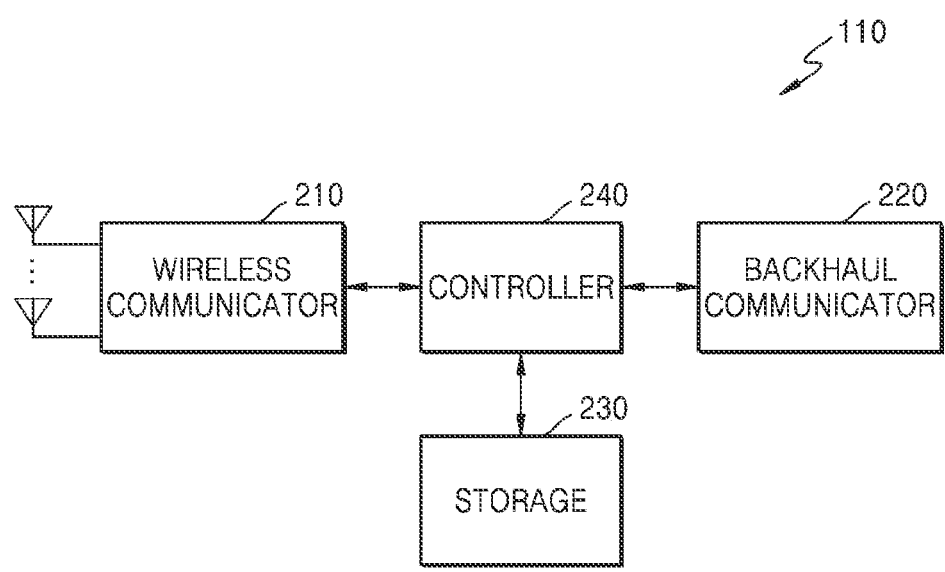
FIG. 2 is a diagram illustrating a configuration of a base station in a wireless communication system, according to various embodiments of the present disclosure.

FIG. 2 illustrates a configuration of a BS in a wireless communication system, according to various embodiments of the present disclosure. The configuration illustrated in FIG. 2 may correspond to a configuration of the BS 110 of FIG. 1. The terms such as "unit", "module", and the like used in the present disclosure indicate a unit, which processes at least one function or motion, and the unit and the module may be implemented by hardware or software, or by a combination of hardware and software.

Referring to FIG. 2, the BS 110 may include a wireless communicator 210, a backhaul communicator 220, a storage 230, and a controller 240.

The wireless communicator 210 (which may be interchangeably used with a transceiver) may perform functions for transmitting and receiving a signal through a wireless channel. For example, the wireless communicator 210 may perform conversion between a baseband signal and a bit string based on physical layer specifications of a system. For example, for data transmission, the wireless communicator 210 may generate complex symbols by encoding and modulating a transmission bit string. Also, for data reception, the wireless communicator 210 may reconstruct a reception bit string by demodulating and decoding a baseband signal.

Also, the wireless communicator 210 may up-convert a baseband signal into a radio frequency (RF) band signal and then may transmit the RF band signal via an antenna, and may down-convert an RF band signal received via the antenna into a baseband signal. To this end, the wireless communicator 210 may include a transmission filter, a reception filter, an amplifier, a mixer, an oscillator, a digital-to-analog converter (DAC), an analog-to-digital converter (ADC), or the like. Also, the wireless communicator 210 may include a plurality of transmission and reception paths. Furthermore, the wireless communicator 210 may include at least one antenna array including a plurality of antenna elements.

In terms of hardware, the wireless communicator 210 may include a digital unit and an analog unit, and the analog unit may include a plurality of sub-units according to operating power, an operating frequency, or the like. The digital unit may be implemented as at least one processor (e.g., a digital signal processor (DSP)).

The wireless communicator 210 may transmit and receive signals as described above. Accordingly, all parts or some parts of the wireless communicator 210 may be referred to as a transmitter, a receiver, or a transceiver. Also, in the descriptions below, transmission and reception performed via a wireless channel may indicate that the aforementioned processing is performed by the wireless communicator 210. According to an embodiment, the wireless communicator 210 may include at least one transceiver.

The backhaul communicator 220 may provide an interface for communicating with other nodes in the network. That is, the backhaul communicator 220 may convert a bit string into a physical signal, the bit string being transmitted from the BS to another node, e.g., another access node, another BS, an upper node, or a core network, and may convert a physical signal in to a bit string, the physical signal being received from another node.

The storage 230 may store data for operations of the BS, e.g., basic programs, application programs, and configuration information. The storage 230 may include a volatile memory, a non-volatile memory, or a combination of a volatile memory and a non-volatile memory. Also, the storage 230 may provide the stored data at the request of the controller 240. According to an embodiment, the storage 230 may include a memory.

The controller 240 may control overall operations of the BS. For example, the controller 240 may transmit and receive a signal via the wireless communicator 210 or via the backhaul communicator 220. Also, the controller 240 records and reads data to and from the storage 230. The controller 240 may perform functions of a protocol stack that are requested by the communication standards. According to another embodiment, the protocol stack may be included in the wireless communicator 210. According to an embodiment, the controller 240 may include at least one processor.

According to various embodiments, the controller 240 may control the BS to perform operations according to various embodiments described below. For example, the controller 240 may perform a channel access procedure on an unlicensed band. For example, the transceiver (e.g., the wireless communicator 210) may receive signals transmitted via the unlicensed band, and the controller 240 may determine whether the unlicensed band is in an idle state, by comparing strength of the received signal with a threshold value that is predefined or is determined as a value according to a function where a bandwidth is a factor. Also, for example, the controller 240 may transmit a control signal to a terminal or receive a control signal from the terminal, via the transceiver. Also, the controller 240 may transmit data to the terminal or receive data from the terminal, via the transceiver. Based on the control signal, control channel, or data channel, received from the terminal, the controller 240 may determine a transmission result with respect to a signal transmitted to the terminal.

Also, for example, based on the transmission result, i.e., a reception result with respect to the control signal, control channel, or data channel received by the terminal, the controller 240 may maintain or change a value of a contention window (hereinafter, referred to as the contention window adjustment) for the channel access procedure. According to various embodiments, the controller 240 may determine a reference slot, to obtain a transmission result for contention window adjustment. The controller 240 may determine a data channel for contention window adjustment in the reference slot. The controller 2340 may determine a reference control channel for contention window adjustment in the reference slot. When it is determined that an unlicensed band is in an idle state, the controller 240 may occupy a channel.

Also, the controller 240 may control to receive uplink data from the terminal through the wireless communicator 210 according to the above content of the present disclosure, and check whether retransmission of one or more code block groups included in the uplink data is required. Also, the controller 240 may control to generate downlink control information for scheduling retransmission of a code block group requiring retransmission and/or initial transmission of uplink data, and transmit the downlink control information to the terminal through the wireless communicator 210. In this case, information indicating whether to retransmit a code block group may be generated according to the above content of the present disclosure. Also, the controller 240 may control the wireless communicator 210 to receive uplink data (re) transmitted according to the downlink control information.

Figure 3:
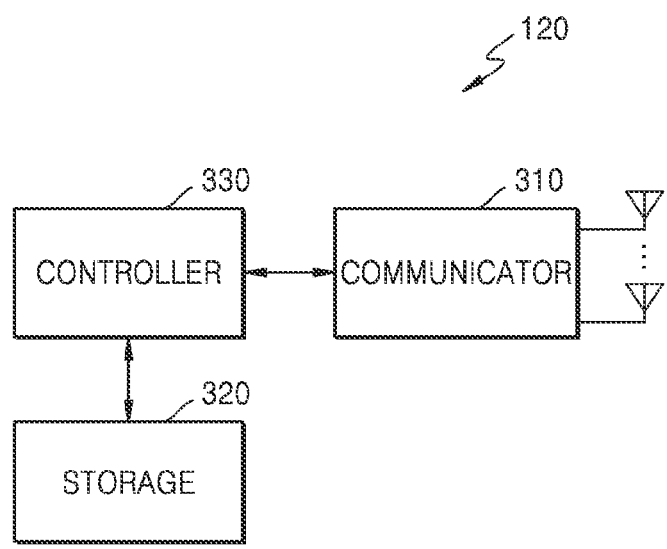
FIG. 3 is a diagram illustrating a configuration of a terminal in a wireless communication system, according to various embodiments of the present disclosure.

FIG. 3 illustrates a configuration of a terminal in a wireless communication system, according to various embodiments of the present disclosure. The configuration illustrated in FIG. 3 may correspond to a configuration of the terminals 110 and 120 described with reference to FIG. 1. The terms such as "unit", "module", and the like used in the present disclosure indicate a unit, which processes at least one function or motion, and the unit and the module may be implemented by hardware or software, or by a combination of hardware and software.

Referring to FIG. 3, the terminal may include a communicator 310, a storage 320, and a controller 330. However, this is merely an example and elements of the terminal are not limited thereto.

The communicator 310 (which may be interchangeably used with a transceiver) may perform functions for transmitting and receiving a signal through a wireless channel. For example, the communicator 310 may perform conversion between a baseband signal and a bit string based on physical layer specifications of a system. For example, for data transmission, the communicator 310 may generate complex symbols by encoding and modulating a transmission bit string. Also, for data reception, the communicator 310 may reconstruct a reception bit string by demodulating and decoding a baseband signal. Also, the communicator 310 may up-convert a baseband signal into an RF band signal and then transmit the RF signal via an antenna, and may down-convert an RF band signal received via the antenna into a baseband signal. For example, the communicator 310 may include a transmission filter, a reception filter, an amplifier, a mixer, an oscillator, a DAC, an ADC, or the like.

Also, the communicator 310 may include a plurality of transmission and reception paths. Furthermore, the communicator 310 may include at least one antenna array including a plurality of antenna elements. In terms of hardware, the communicator 310 may include a digital circuit and an analog circuit (e.g., a radio frequency integrated circuit (RFIC)). The digital circuit and analog circuit may be implemented in one package. Also, the communicator 310 may include a plurality of RF chains. Furthermore, the communicator 310 may perform beamforming.

The communicator 310 may transmit and receive signals as described above. Accordingly, all parts or some parts of the communicator 310 may be referred to as a 'transmitter', a 'receiver', or a 'transceiver'. Also, in the descriptions below, transmission and reception performed via a wireless channel may indicate that the aforementioned processing is performed by the communicator 310. According to an embodiment, the communicator 310 may include at least one transceiver.

The storage 320 may store data for operations of the terminal such as basic programs, application programs, and configuration information. The storage 320 may include a volatile memory, a non-volatile memory, or a combination of a volatile memory and a non-volatile memory. The storage 320 may provide the stored data at the request of the controller 330. According to an embodiment, the storage 320 may include a memory.

The controller 330 may control overall operations of the terminal. For example, the controller 330 may transmit and receive a signal via the communicator 310. Also, the controller 330 records and reads data to and from the storage 320. Also, the controller 330 may perform functions of a protocol stack which are requested by the communication standards. To this end, the controller 330 may include at least one processor or microprocessor or may be a part of a processor. According to an embodiment, the controller 330 may include at least one processor. Also, according to an embodiment, a part of the communicator 310 and/or the controller 330 may be referred to as a communication processor (CP).

According to various embodiments, the controller 330 may control the terminal to perform operations according to various embodiments described below. For example, the controller 330 may receive, via the transceiver (e.g., the communicator 310), a downlink signal (DL control signal or downlink data) transmitted from a BS. Also, for example, the controller 330 may determine a transmission result with respect to the downlink signal. The transmission result may include information of a feedback with respect to ACK, NACK, discontinuous transmission (DTX), etc. of the transmitted downlink signal. In the present disclosure, the transmission result may be referred to as various terms including a reception state of a downlink signal, a reception result of the downlink signal, a decoding result of the downlink signal, HARQ-ACK information of the downlink signal, or the like. Also, for example, the controller 330 may transmit, to the BS, an uplink signal as a response signal to the downlink signal via the transceiver. The uplink signal may explicitly or implicitly include the transmission result of the downlink signal.

The controller 330 may perform a channel access procedure on an unlicensed band. For example, the transceiver (e.g., the communicator 310) may receive signals transmitted via the unlicensed band, and the controller 330 may determine whether the unlicensed band is in an idle state, by comparing strength of the received signal with a threshold value that is predefined or is determined as a value according to a function where a bandwidth is a factor. The controller 330 may perform an access procedure on the unlicensed band so as to transmit a signal to the BS.

Figure 4:
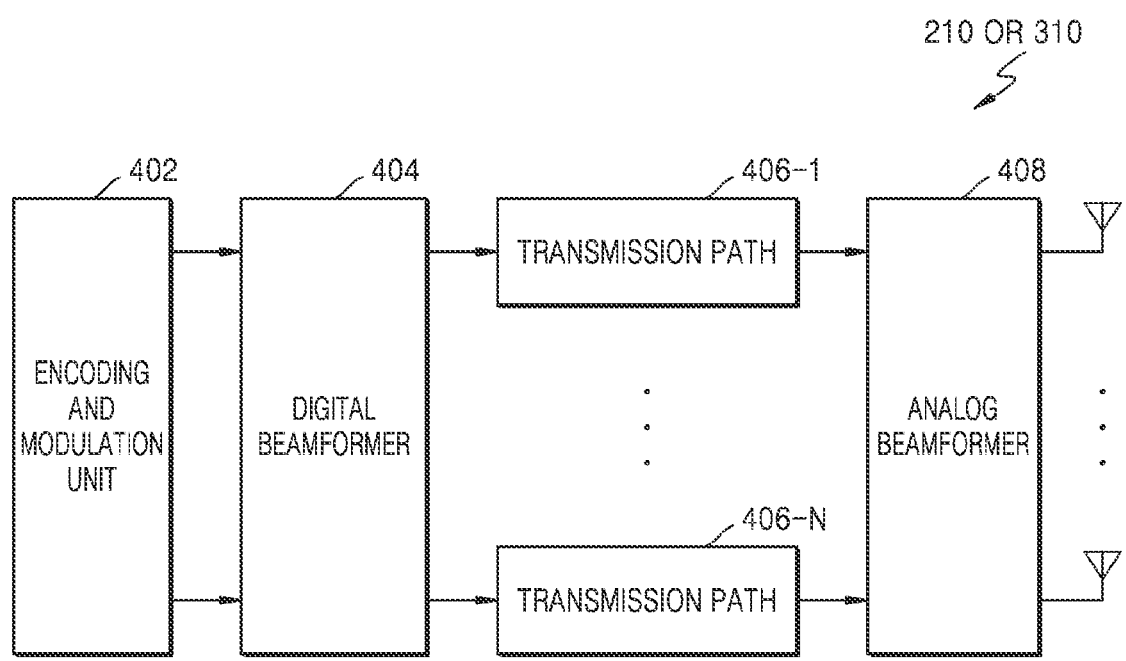
FIG. 4 is a diagram illustrating a configuration of a communicator in a wireless communication system, according to various embodiments of the present disclosure.

FIG. 4 is a diagram for describing a configuration of a communicator in a wireless communication system, according to various embodiments of the present disclosure.

FIG. 4 illustrates an example of a detailed configuration of the wireless communicator 210 of FIG. 2 or the communicator 310 of FIG. 3. In detail, as part of the wireless communicator 210 of FIG. 2 or the communicator 310 of FIG. 3, FIG. 4 illustrates elements for performing beamforming.

Referring to FIG. 4, the wireless communicator 210 or the communicator 310 includes an encoding and modulation unit 402, a digital beamformer 404, a plurality of transmission paths 406-1 to 406-N, and an analog beamformer 408.

The encoding and modulation unit 402 may perform channel encoding. For the channel encoding, at least one of a low-density parity check (LDPC) code, a convolution code, or a polar code may be used. The encoding and modulation unit 402 may generate modulated symbols by performing constellation mapping.

The digital beamformer 404 may perform beamforming on a digital signal (e.g., the modulated symbols). To this end, the digital beamformer 404 may multiply the modulated symbols by beamforming weights. Here, the beamforming weights are used to change a magnitude and phase of a signal, and may be referred to as a precoding matrix or a precoder. The digital beamformer 404 may output modulated symbols that are digitally-beamformed to the plurality of transmission paths 406-1 to 406-N. Here, according to a multiple input multiple output (MIMO) transmission technique, the modulated symbols may be multiplexed or same modulated symbols may be provided to the plurality of transmission paths 406-1 to 406-N.

The plurality of transmission paths 406-1 to 406-N may convert the digitally-beamformed digital signals into analog signals. To this end, each of the plurality of transmission paths 406-1 to 406-N may include an inverse fast Fourier transform (IFFT) operator, a cyclic prefix (CP) inserter, a digital-to-analog converter (DAC), and an up-converter. The CP inserter is arranged for an orthogonal frequency division multiplexing (OFDM) scheme, and may be excluded when another physical layer scheme (e.g., filter bank multi-carrier (FBMC)) is applied. That is, the plurality of transmission paths 406-1 to 406-N may provide independent signal processing processes to a plurality of streams generated through digital beamforming. However, according to implementation methods, some elements of the plurality of transmission paths 406-1 to 406-N may be commonly used.

The analog beamformer 408 may perform beamforming on the analog signals. To this end, the analog beamformer 408 may multiply the analog signals by beamforming weights. Here, the beamforming weights are used to change a magnitude and phase of a signal. In detail, the analog beamformer 408 may be variously configured, based on connection structures between the plurality of transmission paths 406-1 to 406-N and antennas. For example, each of the plurality of transmission paths 406-1 to 406-N may be connected to one antenna array. In another example, the plurality of transmission paths 406-1 to 406-N may be connected to one antenna array. Also, in another embodiment, the plurality of transmission paths 406-1 to 406-N may be adaptively connected to one antenna array or at least two antenna arrays.

In a 5G system, a frame structure needs to be flexibly defined in consideration of various services and requirements. For example, the services may have different subcarrier spacings (SCSs) according to requirements. The current 5G communication system supports a plurality of subcarrier spacings, and each of the subcarrier spacings may be determined by using Equation 1.

$$\Delta f = f_0 2^m \quad \text{[Equation 1]}$$

In Equation 1, $f_0$ denotes a default subcarrier spacing of a system, m denotes a scaling factor of an integer, and $\Delta f$ denotes a subcarrier spacing. For example, when $f_0$=15 kHz, a set of subcarrier spacings allowed for the 5G communication system may include one of 3.75 kHz, 7.5 kHz, 15 kHz, 30 kHz, 60 kHz, 120 kHz, 240 kHz, and 480 kHz. A set of allowed subcarrier spacings may vary according to frequency bands. For example, in a frequency band of 7 GHz or less, at least one subcarrier spacing from among 3.75 kHz, 7.5 kHz, 15 kHz, 30 kHz, 60 kHz may be used, and in a frequency band of 7 GHz or more, at least one subcarrier spacing from among 60 kHz, 120 kHz, 240 kHz, and more may be used.

In various embodiments, a length of an OFDM symbol may be changed according to a subcarrier spacing constituting the OFDM symbol. This is because due to characteristics of the OFDM symbol, the subcarrier spacing and the length of the OFDM symbol have a reciprocal relation to each other. For example, when a subcarrier spacing is doubled, a symbol length is reduced in half, and when the subcarrier spacing is reduced in half, the symbol length is doubled.

Figure 5:
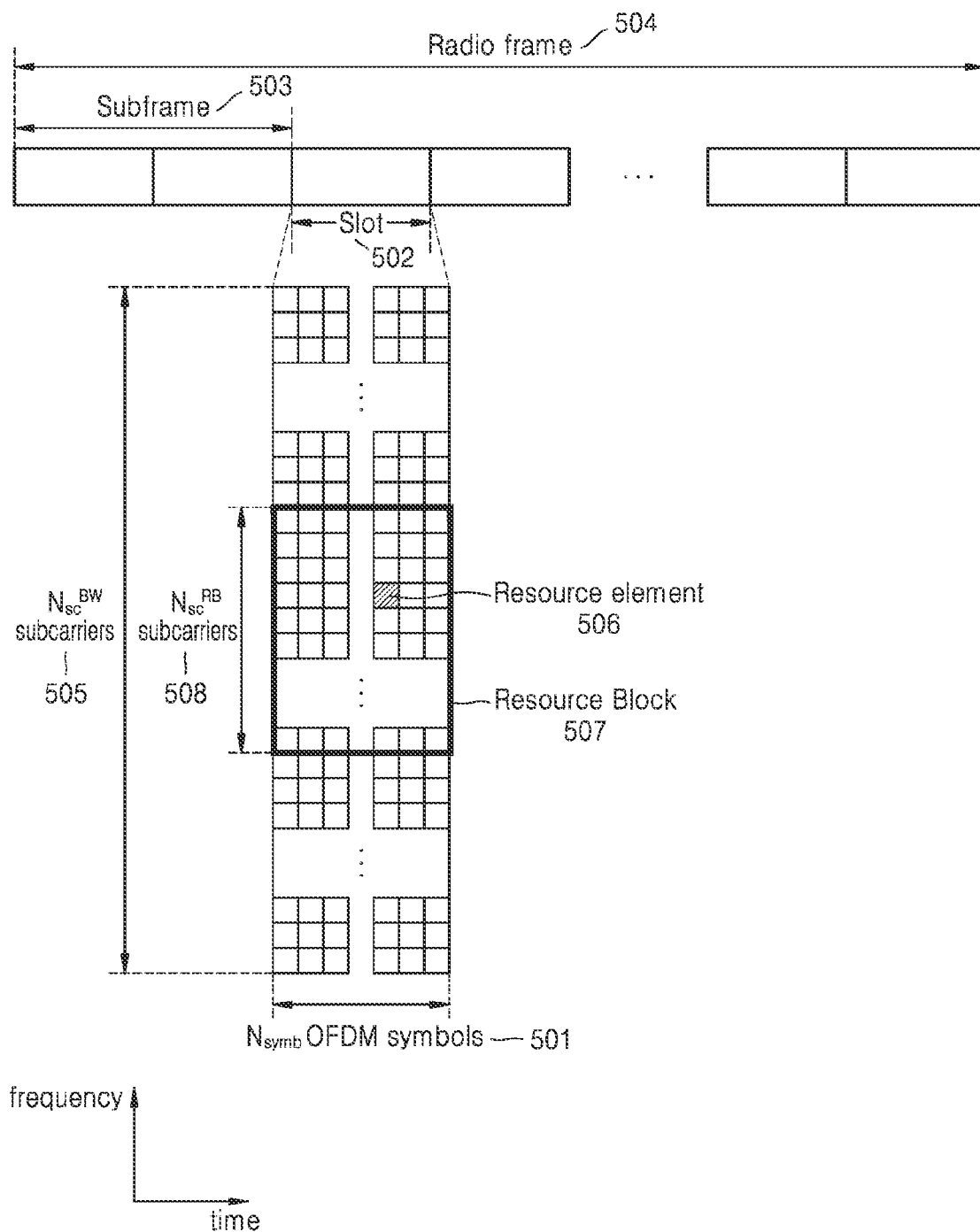
FIG. 5 is a diagram illustrating a radio resource domain in a wireless communication system, according to various embodiments of the present disclosure.

FIG. 5 is a diagram for describing a radio resource domain in a wireless communication system, according to various embodiments of the present disclosure. In various embodiments of the present disclosure, the radio resource domain may include a time-frequency domain structure. In various embodiments, the wireless communication system may include an NR communication system.

Referring to FIG. 5, in the radio resource domain, a horizontal axis represents a time domain and a vertical axis represents a frequency domain. A minimum transmission unit in the time domain may be an OFDM and/or DFT-s-OFDM symbol, and $N_{symb}$ OFDM and/or DFT-s-OFDM symbols 501 may constitute a slot 502. In various embodiments, the OFDM symbol may include a symbol for a case of transmitting and receiving a signal by using an OFDM multiplexing scheme, and the DFT-s-OFDM symbol may include a symbol for a case of transmitting and receiving a signal by using a single carrier frequency division multiple access (SC-FDMA) multiplexing scheme. Hereinafter, for convenience of explanation of the present disclosure, an embodiment of the OFDM symbol will now be described but the embodiment is also applicable to an embodiment of the DFT-s-OFDM symbol. Furthermore, for convenience of explanation of the present disclosure, an embodiment for downlink signal transmission and reception will now be described but the embodiment is also applicable to an embodiment of uplink signal transmission and reception.

When a subcarrier spacing is 15 kHz, unlike in FIG. 5, one slot 502 may constitute one subframe 503 and a length of each of the slot 502 and the subframe 503 may be 1 ms. In various embodiments, the number of slots constituting one subframe 503 and a length of the slot 502 may vary according to a subcarrier spacing. For example, when the subcarrier spacing is 30 kHz, two slots may constitute one subframe 503. In this case, a length of the slot is 0.5 ms and a length of the subframe 503 is 1 ms. A radio frame 504 may be a time domain period including 10 subframes. A minimum transmission unit in the frequency domain is a subcarrier, and carrier bandwidths that constitute a resource grid may include a total of $N_{sc}^{BW}$ subcarriers 505.

However, the subcarrier spacing, the number of slots 502 included in the subframe 503, and the length of the slot 502 may be variably applied. For example, in an LTE system, the subcarrier spacing is 15 kHz and two slots constitute the one subframe 503, in which case the length of the slot 502 may be 0.5 ms and the length of the subframe 503 may be 1 ms. In another embodiment, in an NR system, a subcarrier spacing (µ) may be one of 15 kHz, 30 kHz, 60 kHz, 120 kHz, and 240 kHz, and the number of slots included in one subframe may be 1, 2, 4, 8, or 16 according to the subcarrier spacing (µ).

In the time-frequency domain, a default resource unit may be a resource element (RE) 506, and the RE 506 may be expressed with an OFDM symbol index and a subcarrier index. A resource block (RB) may include a plurality of REs. In the LTE system, a RB (or a physical resource block (PRB)) 507 may be defined by $N_{symb}$ consecutive OFDM symbols 501 in the time domain and $N_{SC}^{RB}$ consecutive subcarriers 508 in the frequency domain. The number of symbols included in one RB may be $N_{symb}$=14, the number of subcarriers may be $N_{SC}^{RB}$=12, and number of RBs ($N_{RB}$) may vary according to a bandwidth of a system transmission band.

In the NR system, the RB 507 may be defined by $N_{SC}^{RB}$ consecutive subcarriers in the frequency domain. The number of subcarriers may be $N_{SC}^{RB}$=12. The frequency domain may include a common resource block (CRB) and a PRB may be defined in a bandwidth part (BWP) in the frequency domain. Different CRB and PRB numbers may be determined according to the subcarrier spacing.

Downlink control information may be transmitted in first N OFDM symbol(s) in a slot. In general, N may be N={1, 2, 3}, and a UE may be configured with the number of symbols in which downlink control information may be transmitted from a BS via higher layer signaling. Furthermore, based on the amount of control information to be transmitted in a current slot, the BS may change the number of symbols in which the downlink control information may be transmitted for each slot, and may transmit information about the number of symbols to the UE via a separate downlink control channel.

In the NR and/or LTE system, scheduling information for downlink data or uplink data may be transmitted via downlink control information (DCI) from the BS to the UE. In various embodiments, the DCI may be defined in various formats, each format being changed according to whether the DCI includes scheduling information for uplink data (UL grant) or scheduling information for downlink data (DL grant), whether the DCI corresponds to compact DCI with a small size of control information or fall-back DCI, whether spatial multiplexing with multiple antennas is applied, and/or whether the DCI corresponds to DCI for power control.

For example, a DCI format (e.g., DCI format 1_0 of NR) corresponding to scheduling control information (DL grant) for downlink data may include at least one of the following pieces of control information.

DCI format identifier: an identifier for identifying a format of the DCI frequency domain resource assignment: indicates an RB allocated for data transmission time domain resource assignment: indicates slots and symbols allocated for data transmission virtual resource block (VRB)-to-PRB mapping: indicates whether to apply a VRB mapping scheme modulation and coding scheme (MCS): indicates a size of a transport block (TB) that is data to be transmitted and modulation scheme used for data transmission new data indicator (NDI): indicates whether it is HARQ initial transmission or retransmission redundancy version (RV): indicates a redundancy version of HARQ HARQ process number: indicates a process number of HARQ physical downlink shared channel (PDSCH) assignment index (or downlink assignment index): indicates the number of PDSCH reception results to be reported from the UE to the BS (e.g., the number of HARQ-ACKs)

transmit power control (TPC) command for physical uplink control channel (PUCCH): indicates a transmit power control command for a PUCCH PUCCH resource indicator: indicates a PUCCH resource used in reporting HARQ-ACK that includes a reception result of a PDSCH configured via the DCI PUCCH transmit timing indicator (or PDSCH-to-HARQ_feedback timing indicator): indicates information about a slot or a symbol in which a PUCCH for reporting HARQ-ACK including a reception result of a PDSCH configured via the DCI is to be transmitted The DCI may undergo a channel coding and modulation process and then may be transmitted on a physical downlink control channel (PDCCH) or enhanced PDCCH (EPDCCH). Hereinafter, transmission and reception on a PDCCH or EPDCCH may be understood as DCI transmission and reception on the PDCCH or EPDCCH, and transmission and reception on a PDSCH may be understood as downlink data transmission and reception on the PDSCH.

In various embodiments, a cyclic redundancy check (CRC) scrambled by a particular radio network temporary identifier (RNTI) or a cell RNTI (C-RNTI) that is independent for each UE, may be added to the DCI, and the DCI for each UE may be channel coded and then may be configured into an independent PDCCH and transmitted. In the time domain, the PDCCH may be transmitted during a control channel transmission period. In the frequency domain, a mapping position of the PDCCH may be determined by at least an identifier (ID) of each UE, and may be transmitted in the entire system transmission band or configured frequency bands of the system transmission band. According to another example, in the frequency domain, a mapping position of the PDCCH may be configured by higher layer signaling.

Downlink data may be transmitted on a physical downlink shared channel (PDSCH) that is a physical channel for transmission of downlink data. The PDSCH may be transmitted after a control channel transmission period, and in the frequency domain, scheduling information such as a mapping position of the PDSCH and a modulation scheme for the PDSCH may be determined based on the DCI transmitted via the PDCCH.

The BS may notify the UE of a modulation scheme applied to the PDSCH to be transmitted and a size of data to be transmitted (transport block size (TBS)) through modulation and coding scheme (MCS) information in the control information configuring the DCI. In various embodiments, an MCS may be configured of 5 bits or greater than or less than 5 bits. The TBS may correspond to the size of a TB before channel coding for error correction is applied to the data (TB) to be transmitted by the BS.

In the NR system, a modulation scheme supported for uplink and downlink data transmission may include at least one of quadrature phase shift keying (QPSK), 16 quadrature amplitude modulation (16QAM), 64QAM, or 256QAM, and each modulation order Qm may be 2, 4, 6, or 8. That is, 2 bits per symbol may be transmitted for QPSK modulation, 4 bits per symbol may be transmitted for 16QAM modulation, 6 bits per symbol may be transmitted for 64QAM modulation, and 8 bits per symbol may be transmitted for 256QAM modulation. Also, a modulation scheme above 256QAM may be used according to system modification.

Figure 6:
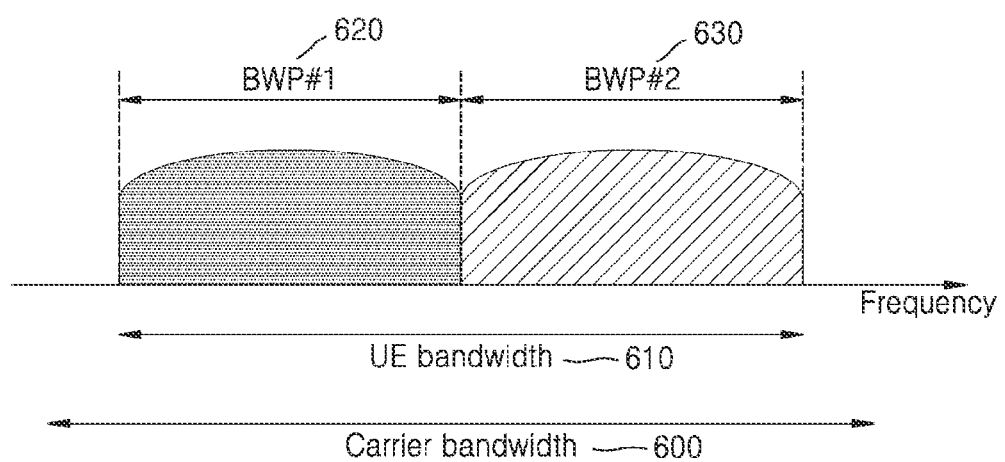
FIG. 6 is a diagram illustrating a bandwidth part configuration in a wireless communication system, according to an embodiment of the present disclosure.

FIG. 6 is a diagram for describing a bandwidth part configuration in a wireless communication system, according to an embodiment of the present disclosure.

A base station may configure one or more bandwidth parts for a UE, and in this case, a size of each bandwidth part may be equal to or less than a bandwidth of a carrier or cell. FIG. 6 illustrates an example where a bandwidth 610 of a UE is set to two bandwidth parts (BWPs), that is, a BWP #1 620 and a BWP #2 630. The UE may be configured, by a base station, with various BWP-related parameters such as a BWP identifier (BWP-Id), a BWP frequency position, a subcarrier spacing, and a cyclic prefix through a higher layer signal. The base station may transmit the information to the UE through higher layer signaling, for example, RRC signaling.

At a specific time point, at least one BWP from among the one or more BWPs configured for the UE may be activated and the activated BWP may be changed. Whether the activated BWP is activated and/or changed may be transmitted from the base station to the UE semi-statically through RRC signaling or dynamically through a medium access control (MAC) control element (CE) or DCI.

Even when the bandwidth 610 supported by the UE is less than a system bandwidth or a carrier bandwidth 600, through a BWP, the UE may transmit and receive data to and from the base station at a specific frequency position within the system bandwidth. In addition, different subcarrier spacings may be supported in the base station or cell. For example, in order to support data transmission and reception using a subcarrier spacing of 15 kHz and a subcarrier spacing of 30 kHz with respect to the UE, two BWPs may be configured to respectively use the subcarrier spacing of 15 kHz and the subcarrier spacing of 30 kHz. Different BWPs may be frequency division multiplexed (FDMed). When the base station is to transmit and receive data using a specific subcarrier spacing, a BWP configured for the corresponding subcarrier spacing may be changed or activated. In another example, the base station may configure a narrow BWP and a wide BWP for the UE in order to reduce power consumption of the UE; when there is no traffic, the base station may activate the narrow BWP of the UE to minimize power consumption of the UE; and when data is generated, the base station may change the activated BWP of the UE to the wide BWP or activate the wide BWP to transmit and receive data at a high data transmission rate.

Figure 7:
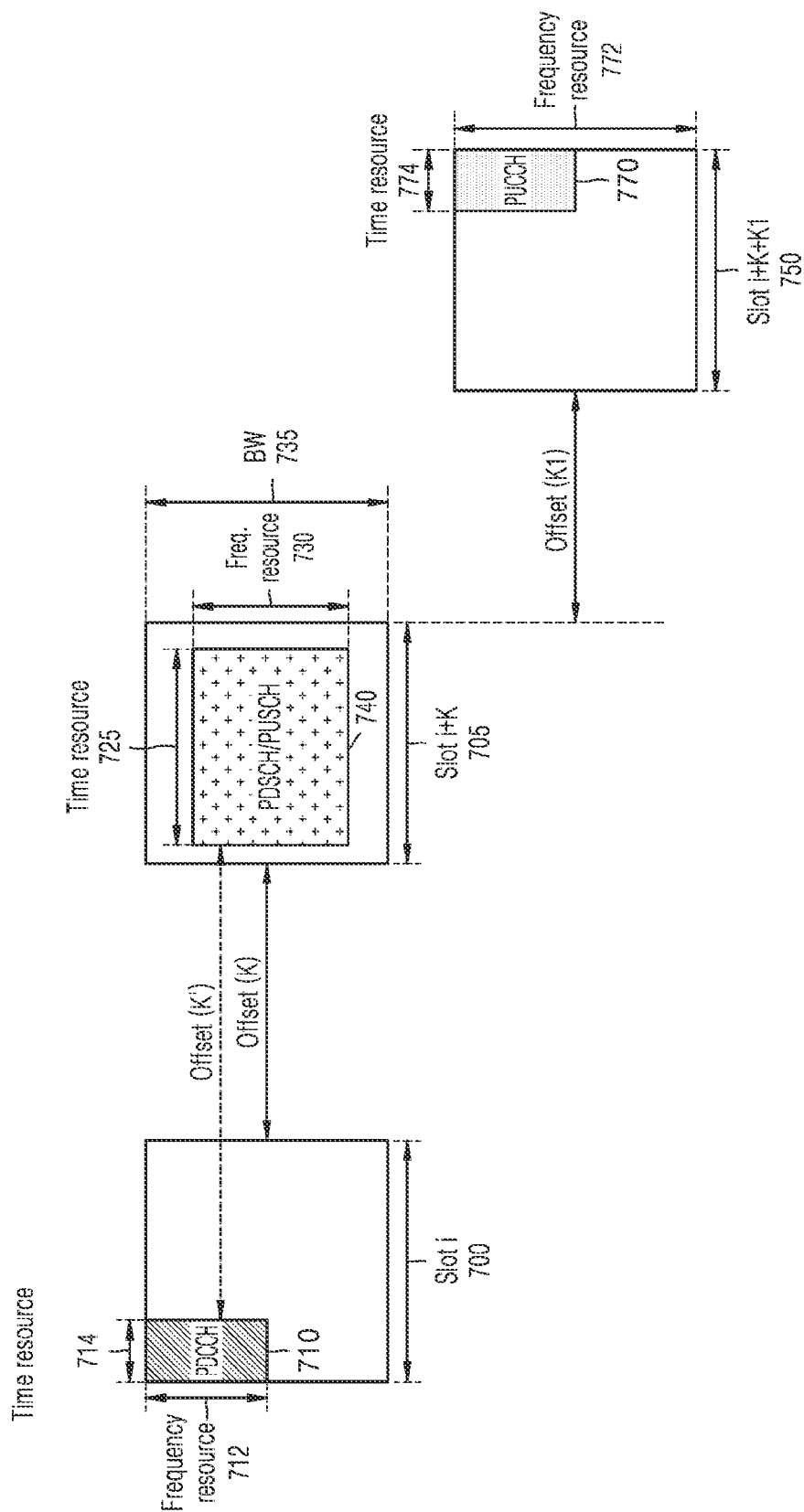
FIG. 7 is a diagram illustrating scheduling and feedback in a wireless communication system, according to various embodiments of the present disclosure.

FIG. 7 is a diagram for describing scheduling and feedback in a wireless communication system, according to various embodiments of the present disclosure.

Referring to FIG. 7, a BS may transmit, to a UE, control information including scheduling information for a downlink and/or uplink data channel. The BS may transmit downlink data to the UE according to the scheduling information. The UE receiving the data may transmit, to the BS, HARQ-ACK information that is feedback on the downlink data. Alternatively, the UE may transmit, to the BS, uplink data according to the scheduling information. The BS receiving the data may transmit, to the UE, HARQ-ACK information that is feedback on the uplink data. In this case, the feedback may be determined by the UE through NDI or a new data indicator value of the scheduling information for the uplink data channel.

In an NR system, an uplink and downlink HARQ scheme may include an asynchronous HARQ scheme in which a data retransmission time is not fixed. For example, for a downlink, when the BS receives, from the UE, NACK as feedback on downlink data transmitted by the BS, the BS may freely determine a retransmission time of the downlink data according to a scheduling operation of the BS. The UE scheduled for downlink data retransmission from the BS may perform buffering on data determined as an error as a result of decoding reception data for an HARQ operation with previously received downlink data and then may combine the buffered data with data retransmitted from the BS. The BS may be the BS 110 of FIG. 1, and the UE may be any of the UEs 120 and 130 of FIG. 1.

Referring to FIG. 7, a resource domain in which a data channel is transmitted in a 5G or NR communication system is illustrated. The UE may monitor and/or search for a PDCCH 710 in a downlink control channel (PDCCH) domain (hereinafter, a control resource set (CORESET) or a search space (SS)) configured through a higher layer signal from the BS. In this case, the PDCCH domain includes a time domain 714 and a frequency domain 712. The time domain 714 may be configured in units of symbols, and the frequency domain 712 may be configured in units of RBs or RB groups.

When the UE detects the PDCCH 710 in a slot i 700, the UE may obtain DCI transmitted through the detected PDCCH 710. Through the received DCI, the UE may obtain scheduling information of a downlink data channel or uplink data channel 740. In other words, the DCI may include information of a time-frequency resource domain (or PDSCH transmission region) in which the UE is requested to receive a downlink data channel (or PDSCH) transmitted from the BS, or information of a time-frequency resource domain allocated from the BS to the UE for transmission of an uplink data channel (or a physical uplink shared channel (PUSCH)).

A case in which the UE is scheduled for PUSCH transmission will now be described as an example. The UE receiving DCI may obtain a slot index or offset information K for receiving a PUSCH through the DCI, and may determine a PUSCH transmission slot index. For example, the UE may determine that the UE is scheduled to transmit the PUSCH in a slot i+K 705 through the received offset information K, based on the slot i 700 in which the PDCCH 710 is received. The UE may also determine the slot i+K 705 or a PUSCH start symbol or time in the slot i+K 705 through the received offset information K, based on the CORESET in which the PDCCH 710 is received.

Also, the UE may obtain, from the DCI, information about a PUSCH transmission time-frequency resource domain 740 in the PUSCH transmission slot 705. PUSCH transmission frequency resource domain information 730 may include information of a PRB or a group unit of PRBs. Meanwhile, the PUSCH transmission frequency resource domain information 730 may be information about a domain included in an initial uplink bandwidth (BW) or an initial uplink BWP determined or configured by the UE through an initial access procedure. When the UE is configured with an uplink BW or an uplink BWP through a higher layer signal, the PUSCH transmission frequency resource domain information 730 may be information about a domain included in the uplink BW or the uplink BWP which is configured through a higher layer signal.

In various embodiments, PUSCH transmission time resource domain information 725 may be information about a symbol or a group unit of symbols, or may be information indicating absolute time information. The PUSCH transmission time resource domain information 725 may be represented as a combination of a PUSCH transmission start time or symbol and a length of a PUSCH, or a PUSCH transmission end time or symbol, and may be included as one field or value in the DCI. The UE may transmit the PUSCH in the PUSCH transmission resource domain 740 determined through the DCI. In an embodiment, the above descriptions may also be applied to a downlink data channel (PDSCH) for transmitting downlink data.

In various embodiments, the UE receiving the PDSCH 740 may report (feedback) a reception result (e.g., HARQ-ACK/NACK) of the PDSCH 740 to the BS. In this case, a transmission resource for an uplink control channel (PUCCH) 770 in which the reception result (i.e., uplink control information) of the PDSCH 740 is transmitted may be determined by the UE based on a PDSCH-to-HARQ timing indicator and a PUCCH resource indicator which are indicated by the DCI 710 that schedules the PDSCH 740. In other words, the UE receiving K1 that is the PDSCH-to-HARQ timing indicator through the DCI 710 may transmit the PUCCH 771 in a slot i+K+K1 750 after K1 starting from a reception slot 705 of the PDSCH 740.

The BS may configure one or more K1 values for the UE through higher layer signaling, or may indicate a particular K1 value to the UE through the DCI as described above. K1 may be determined according to HARQ-ACK processing capability of the UE, in other words, according to a minimum time required for the UE to receive a PDSCH and generate and report HARQ-ACK about the PDSCH. Also, before the UE is configured with a K1 value, the UE may use a predefined value or a default value as a K1 value. In this case, through a non-numerical value or one of K1 values predefined or configured through a higher layer signal, a time for the UE to transmit a reception result (HARQ-ACK) for the PDSCH may not be indicated.

In this case, transmission of the PUCCH 770 in the PUCCH transmission slot 750 may be performed in a resource indicated through a PDCCH resource indicator of the DCI 710. In this case, when a plurality of PUCCH transmissions are configured or indicated in the PUCCH transmission slot 750, the UE may perform PUCCH transmission in a PUCCH resource other than the resource indicated through the PUCCH resource indicator of the DCI 710.

A method of allocating uplink/downlink frequency resources will be described. An uplink/downlink frequency resource for transmitting a signal or a channel may be consecutively or non-consecutively allocated, and when a specific resource allocation type is determined, information indicating uplink/downlink frequency resource allocation is interpreted according to the specific resource allocation type. Although a signal and a channel are separately used in the G3PP standard, in the present disclosure, an uplink/downlink transmission signal or an uplink/downlink transmission channel may be interchangeably used without separation, or an uplink/downlink transmission signal may be used to indicate or represent both the uplink/downlink transmission signal or uplink/downlink transmission channel. This is because a method of determining an uplink/ downlink frequency resource allocation type or an uplink/downlink transmission start portion of the present disclosure may be commonly applied to both the uplink/downlink transmission signal or the uplink/downlink transmission channel. In this case, without separation or description, the method of determining an uplink/downlink frequency resource allocation type or an uplink/downlink transmission start position proposed in the present disclosure may be independently applied to each of the uplink/downlink transmission signal and the uplink/downlink transmission channel. Hereinafter, for convenience of explanation, a resource refers to a frequency resource.

Resource Allocation Type 0

A resource allocation type 0 scheme is a scheme of allocating resources in units of resource block groups (RBGs) each including P consecutive resource blocks (RBs). In this case, a size P of the RBG may be configured to be one of Configuration 1 and Configuration 2 through a higher layer signal, for example, an rbg-size value of pdsch-Config or pusch-Config and P may be determined based on the information and a size of an activated uplink/downlink BWP as shown in Table 1. Table 1 shows a size of P according to a size of a BWP and an RBG configuration value. In this case, the size of the BWP is the number of PRBs constituting the BWP.

TABLE 1

| Carrier Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The total number of RBGs constituting an uplink/downlink BWP ($N_{BWP}$) may be determined to be $N_{RBG}$=ceiling($(N_{BWP}^{size}+N_{BWP}^{start}$ mod P$)$/P). A size of a first RBG ($RBG_0$) is P−$N_{BWP}^{start}$ mod P. When a size of ($N_{BWP}^{start}$+$N_{BWP}^{size}$) mod P is greater than 0, a size of a last RBG ($RBG_{last}$) is ($N_{BWP}^{start}$+$N_{BWP}^{size}$) mod P, and when a size of ($N_{BWP}^{start}$+$N_{BWP}^{size}$) mod P is not greater than 0, a size of the last RBG ($RBG_{last}$) is P. A size of the remaining RBG excluding the first and last RBGs is P. In this case, $N_{BWP}^{start}$ refers to a CRB at which the BWP relatively starts from CRB0, and may be a point where a specific BWP starts in the CRB. $N_{BWP}^{size}$ refers to the number of RBs included in the BWP.

In this case, a length (or size or the number of bits) of frequency resource allocation information may be equal to $N_{RBG}$, and the UE may be configured or scheduled in units of RBGs with a resource on which uplink/downlink transmission is configured or scheduled for each RBG through a bitmap including $N_{RBG}$ bits. For example, the UE may determine that an RBG region set to 1 in the bitmap is a resource allocated for uplink/downlink transmission and reception and an RBG region set to 0 is not a resource allocated for uplink/downlink transmission and reception. In this case, the RBG bitmap is arranged and mapped sequentially (in an ascending order) along an axis where a frequency increases. Through this scheme, consecutive or non-consecutive RBGs may be allocated for uplink transmission.

Resource Allocation Type 1

A resource allocation type 1 scheme is a scheme of allocating consecutive frequency resources in an activated uplink/downlink BWP. Frequency allocation information of the resource allocation type 1 scheme may be indicated to the UE through a resource indication value (RIV). A length (or size or the number of bits) of the frequency resource allocation information is equal to ceiling($\log_2$ ($N_{BWP}$($N_{BWP}$+1)/2). The RIV may indicate a starting RB ($RB_{start}$) for frequency resource allocation and L consecutively allocated RBs ($L_{RBs}$).

if $(L_{RBs} - 1) \leq \left\lfloor \frac{N_{BWP}}{2} \right\rfloor$ then $RIV = N_{BWP}(L_{RBs} - 1) + RB_{start}$ Else, $RIV = N_{BWP}(N_{BWP} - L_{RBs} + 1) + (N_{BWP} - 1 - RB_{start})$ where, $L_{RBs} \geq 1$ and shall not exceed $N_{BWP} - RB_{start}$ $N_{BWP}$ denotes a size of an activated uplink/downlink BWP and is expressed with the number of PRBs, $RB_{start}$ denotes a first PRB at which uplink/downlink resource allocation starts, and $L_{RB}$ denotes a length or the number of consecutive PRBs. In this case, when one of pieces of DCI (uplink grant) for configuring or scheduling uplink/downlink transmission and reception, for example, DCI format 0_0, is transmitted in a common search space (CSS), $N_{BWP,0}$ that is a size of an initial uplink/downlink BWP may be used.

Also, in the case of DCI format 0_0 or DCI format 1_0 transmitted in a UE-specific common search space (USS), a size of a frequency resource allocation information or the number of bits for uplink/downlink grant is determined based on a size ($N_{initial,BWP}$) of an initial BWP, but when the uplink/downlink DCI is DCI for scheduling another activated BWP ($N_{active,BWP}$, size of the activated BWP), an RIV is $RB_{start}$=0, K, 2K, . . . , ($N_{active,BWP}$−1)·K and $L_{RBs}$= K, 2K, . . . , $N_{initial,BWP}$·K, and is configured as follows.

if $(L'_{RBs} - 1) \leq \left\lfloor \frac{N_{initial BWP}}{2} \right\rfloor$ then $RIV =$ $N_{initial,BWP}(L'_{RBs} - 1) + RB'_{start}$ Else, $RIV =$ $N_{initial,BWP}(N_{initial,BWP} - L'_{RBs} + 1) + (N_{initial,BWP} - 1 - RB'_{start})$ where, $L'_{RBs} = \frac{L_{RBs}}{K}, RB'_{start} = \frac{RB_{start}}{K},$ and where $L'_{RBs}$ shall not exceed $N_{initial,BWP} - RB'_{start}$ In this case, for $N_{active,BWP} > N_{initial,BWP}$, K may be a natural number satisfying K≤⌊$N_{active,BWP}/N_{initial,BWP}$⌋, and particularly, may be one of {1, 2, 4, 8}. Otherwise, K=1.

Resource Allocation Type 2

A resource allocation type 2 scheme is a scheme of allocating frequency resources so that frequency resources for transmitting an uplink/downlink signal or channel are distributed in an entire activated uplink BWP, where a distance or an interval between the allocated frequency resources is equal. Because resources are uniformly allocated across the entire frequency band with the resource allocation type 2, the resource allocation type 2 may be limitedly applied to uplink/downlink signal and channel transmission with a carrier, a cell, or a BWP operating in a unlicensed band requested to satisfy requirements for frequency allocation such as power spectral density (PSD) and occupancy channel bandwidth (OCB).

Figure 8:
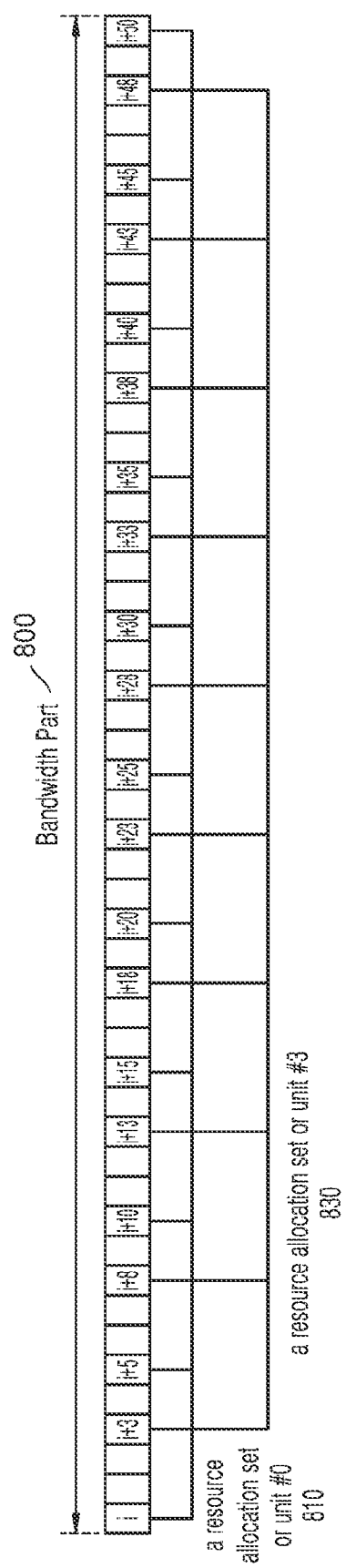
FIG. 8 is a diagram illustrating a frequency resource allocation method in a wireless communication system, according to various embodiments of the present disclosure.

FIG. 8 is a diagram illustrating a frequency resource allocation method in a wireless communication system, according to various embodiments of the present disclosure.

In FIG. 8, for example, a resource allocation type 2 scheme will be described. Referring to FIG. 8, a UE is configured to perform uplink/downlink transmission and reception with a BS in a BWP 820, and is scheduled with uplink/downlink data channel transmission through a resource allocation type 2 scheme. It is assumed that the BWP 820 includes 51 PRBs, but this is merely an example. According to the resource allocation type 2 scheme, the 51 PRBs may include L (in FIG. 8, L=5) resource domain sets 810, and each resource domain set may include $$N = \left\lfloor \frac{N_{BWP}}{L} \right\rfloor \text{ or } N = \left\lfloor \frac{N_{BWP}}{L} \right\rfloor + 1$$

PRBs. In FIG. 8, the first resource domain set 810 includes 11 PRBs (#i, #i+5, #i+10, #i+15, . . . , #i+45, #i+50), and the remaining resource domain sets, for example, a third resource domain set 830, includes 10 PRBs (#i+3, #i+8, #i+13, #i+18, . . . , #i+48). In other words, the number of PRBs included in a resource domain set may vary according to a size of a BWP or the number of PRBs in the BWP. The UE may be allocated one or more resource domain sets configured as described above, and may be allocated consecutive resource domain sets (e.g., resource domain sets #0, #1 or #2, #3, #4) through a method similar to a resource allocation type 1 scheme (e.g., allocation based on an RIV) or may be allocated consecutive or non-consecutive resource domain sets through a method similar to an uplink resource allocation type 0 scheme (e.g., allocation based on a bitmap).

When the UE is allocated consecutive resource domain sets, in a manner similar to the resource allocation type 1, the UE may determine allocated frequency resource domains (or allocated resource domain sets) with a resource indication value (RIV) expressed with a start resource domain set ($RB_{start}$) for frequency resource allocation and L consecutive resource domain sets, and in this case, the RIV is as follows. In this case, N may be the total number of resource domain sets.

$$\text{if } (L-1) \leq \left\lfloor \frac{N}{2} \right\rfloor \text{ then } RIV = N(L-1) + RB_{start}$$

$$\text{Else, } RIV = N(N-L+1) + (N-1-RB_{start})$$

For example, RIV=0 refers to a first resource domain set or resource domain set #0, and may indicate that one resource domain set including PRB #i, #i+10, #i+20, . . . , #i+50 of FIG. 8 is allocated. In this case, a length (or size or the number of bits) of frequency resource allocation information is equal to ceiling ($\log_2$ (N(N+1)/2).

In another example, when the UE is allocated consecutive or non-consecutive resource domain sets by using a bitmap, the bitmap may be configured in L bits respectively indicating L resource domain sets constituting the BWP 820 in an ascending frequency resource order or an ascending order of resource domain set indexes, and the BS may allocate the resource domain sets through the bitmap. For example, in FIG. 8, a position of a resource domain set may be indicated through a bitmap configured in 5 bits, and bitmap 10000 indicates that a first resource domain set, that is, one resource domain set including PRB #i, #i+10, #i+20, . . . , #i+50 of FIG. 8, is allocated. Bitmap 00010 indicates that a fourth resource domain set, that is, a resource domain set including PRB #i+3, #i+8, #i+13, #i+18, . . . , #i+48 of FIG. 8, is allocated. In this case, a length (or size or the number of bits) of frequency resource allocation information is equal to L.

Similarly to a frequency, the UE may be configured with a time resource domain of an uplink data channel through the following scheme. The time resource domain of the uplink data channel may be expressed with a start and length indicator value (SLIV) and may be indicated to the UE. The SLIV is a value determined by a start symbol S for time resource allocation in a slot and L consecutively allocated symbols and is as follows. When (L−1) is equal to or less than 7, the SLIV is 14·(L−1)+S, and when (L−1) is greater than 7, the SLIV is 14·(14−L+1)+(14−1−S). In this case, a value of L is a value greater than 0 and equal to or less than 14.

In a 5G communication system, in order to dynamically change a downlink signal transmission interval and an uplink signal transmission interval in a time division duplex (TDD) system, whether each of OFDM symbols constituting one slot is a downlink symbol, an uplink symbol, or a flexible symbol may be indicated by a slot format indicator (SFI). A symbol indicated as a flexible symbol may be neither a downlink symbol nor an uplink symbol, or may be a symbol which may be changed to a downlink symbol or an uplink symbol by UE-specific control information or scheduling information. In this case, the flexible symbol may include a gap guard required in a process of switching from downlink to uplink.

The slot format indicator may be concurrently transmitted to a plurality of UEs through a UE group (or cell) common control channel. In other words, the slot format indicator is transmitted through a PDCCH that is CRC-scrambled by a UE-specific identifier (cell-RNTI (C-RNTI)) and another identifier (e.g., an SFI-RNTI). In various embodiments, the slot format identifier may include information about N slots, where N may be an integer or a natural number greater than 0, or may be a value configured for the UE by the BS through a higher layer signal from among a set of predefined possible values, such as 1, 2, 5, 10, and 20. A size of slot format indicator information may be configured for the UE by the BS through a higher layer signal. Examples of a slot format that may be indicated by the slot format indicator are shown in Table 2.

TABLE 2

| | SYMBOL NUMBER (OR INDEX) IN ONE SLOT | | | | | | | | | | | | | |
|---|---|---|---|---|---|---|---|---|---|---|---|---|---|---|
| FORMAT | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |

TABLE 2-continued

| FORMAT | \multicolumn{14}{c}{SYMBOL NUMBER (OR INDEX) IN ONE SLOT} | | | | | | | | | | | | | |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | U | U | U | U |
| 26 | D | D | F | F | F | F | F | F | F | F | U | U | U | U |
| 27 | D | D | D | F | F | F | F | F | F | F | U | U | U | U |
| 28 | D | D | D | D | D | D | D | D | D | D | D | F | F | U |
| 29 | D | D | D | D | D | D | D | D | D | D | F | F | F | U |
| 30 | D | D | D | D | D | D | D | D | D | F | F | F | F | U |
| 31 | D | D | D | D | D | D | D | D | D | D | F | U | U | U |
| 32 | D | D | D | D | D | D | D | D | D | F | F | U | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |
| 44 | D | D | D | D | D | D | F | F | F | F | F | F | U | U |
| 45 | D | D | D | D | D | F | F | U | U | U | U | U | U | U |
| 46 | D | D | D | D | F | U | D | D | D | D | D | F | U | U |
| 47 | D | D | F | U | U | U | D | D | F | U | U | U | U | U |
| 48 | D | F | U | U | U | U | D | F | U | U | U | U | U | U |
| 49 | D | D | D | F | F | U | D | D | D | D | F | F | U | U |
| 50 | D | D | F | F | U | U | D | D | F | F | U | U | U | U |
| 51 | D | F | F | U | U | U | D | F | F | U | U | U | U | U |
| 52 | D | F | F | F | F | U | D | F | F | F | F | F | F | U |
| 53 | D | D | F | F | F | U | D | D | F | F | F | F | U | U |
| 54 | F | F | F | F | F | F | D | D | D | D | D | D | D | D |
| 55 | D | D | F | F | F | U | U | U | D | D | D | D | D | D |
| 56-254 | \multicolumn{14}{c}{Reserved} | | | | | | | | | | | | | |
| 255 | \multicolumn{14}{l}{UE determines the slot format fo the slot based on TDD-UL-DL-ConfigurationCommon, or TDD-UL-DL-ConfigDedicated and, if any, on detected DCI formats} | | | | | | | | | | | | | |

In Table 2, D denotes downlink, U denotes uplink, and X denotes a flexible symbol. According to Table 2, the total number of available slot formats is 256. In a current NR system, a maximum size of a slot format indicator information bit is 128 bits, and the slot format indicator information bit is a value that may be configured for the UE by the BS through a higher layer signal (e.g., dci-PayloadSize). In this case, a cell operating in a licensed band or an unlicensed band may configure and indicate additional slot formats as shown in Table 3 by introducing one or more additional sots formats or modifying at least one of existing slot formats. Table 2 shows examples of a slot format in which one slot includes an uplink (U) and a flexible symbol (F).

TABLE 3

| FORMAT | \multicolumn{14}{c}{SYMBOL NUMBER (OR INDEX) IN ONE SLOT} | | | | | | | | | | | | | |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |

TABLE 3-continued

| | SYMBOL NUMBER (OR INDEX) IN ONE SLOT | | | | | | | | | | | | | |
|---|---|---|---|---|---|---|---|---|---|---|---|---|---|---|
| FORMAT | 0 | 1 | 2 | 3 | 4 | 5 | 6 | 7 | 8 | 9 | 10 | 11 | 12 | 13 |
| 58 | U | U | U | U | U | U | U | U | U | U | U | U | U | F |
| 59 | U | U | U | U | U | U | U | U | U | U | U | U | F | F |
| ... | | | | | | | | | | | | | | |

In various embodiments, slot format indicator information may include slot formats of a plurality of serving cells, and the slot formats of the serving cells may be identified through serving cell IDs. A slot format combination of slot format indicators for one or more slots may be included with respect to each serving cell. For example, when a size of the slot format indicator information bit is 3 bits and the slot format indicator information includes a slot format indicator for one serving cell, the 3-bit slot format indicator information may be one of eight slot format indicators or slot format indicator combinations (hereinafter, slot format indicator), and the BS may indicate one of the eight slot format indicators through UE group common control information (group common DCI).

In various embodiments, at least one of the eight slot format indicators may include a slot format indicator for a plurality of slots. For example, Table 4 shows examples of the 3-bit slot format indicator information including the slot format of Table 2 or 3. Five slot format combination IDs of the slot format indicator information (slot format combination ID 0, 1, 2, 3, 4) are slot format indicators for one slot, and the remaining three slot format combination IDs (slot format combination ID 5, 6, 7) are slot format indicators for four slots and may be sequentially applied to the four slots. In this case, the slot format indicator information may be sequentially applied from a slot receiving the slot format indicator.

TABLE 4

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The UE may receive, through a higher layer signal, configuration information about a PDCCH in which the UE is requested to detect slot format indicator information, and may detect a slot format indicator according to configuration information. For example, the terminal may be configured, through a higher layer signal, with at least one of CORESET configuration for detecting slot format indicator information, search space configuration, RNTI information used in CRC scrambling of DCI carrying the slot format indicator information, a period of a search space, and offset information.

For a system that performs communication in an unlicensed band, a communication device (a BS or a UE) that attempts to transmit a signal in the unlicensed band may perform, before transmission of the signal, a channel access procedure or LBT on the unlicensed band in which the communication device performs communication, and may access the unlicensed band and perform signal transmission when it is determined that the unlicensed band is in an idle state according to the channel access procedure. When it is determined that the unlicensed band is not in the idle state according to the channel access procedure, the communication device may not perform signal transmission.

The channel access procedure in the unlicensed band may be classified according to whether a time to start the channel access procedure of the communication device is fixed (frame-based equipment (FBE)) or variable (load-based equipment (LBE)). In addition to the time to start the channel access procedure, according to whether a transmit/receive structure of the communication device has a cycle or does not have a cycle, the communication device may be determined to be the FBE or the LBE. In this case, the time to start the channel access procedure being fixed means that the channel access procedure of the communication device may periodically start according to a predefined cycle or a cycle declared or configured by the communication device. As another example, the time to start the channel access procedure being fixed may mean that the transmit/receive structure of the communication device has a cycle. The time to start the channel access procedure being variable means that the communication device may transmit a signal in an unlicensed band at any time. As another example, the time to start the channel access procedure being variable may mean that the transmit/receive structure of the communication device may be determined when required without having a cycle.

Hereinafter, a channel access procedure in a case where a time to start the channel access procedure of a communication device is variable (load-based equipment (LBE)) (hereinafter, traffic-based channel access procedure or LBE-based channel access procedure) will now be described.

A channel access procedure in an unlicensed band may include a procedure of measuring strength of a signal received by the communication device in the unlicensed band for a fixed time or a time calculated according to a predefined rule (e.g., a time calculated with at least a random value selected by the BS or the UE), and determining an idle state of the unlicensed band by comparing the measured strength of the signal with a predefined threshold or a threshold calculated by a function that determines the magnitude of the strength of the received signal according to at least one parameter among a channel bandwidth, a bandwidth in which a signal is to be transmitted, and/or strength of transmission power.

For example, the communication device may measure the strength of the received signal for a time Xus (e.g., 25 us) immediately before a time point to transmit a signal, may determine that the unlicensed band is in the idle state when the strength of the measured signal is less than a threshold T (e.g., −72 dBm) predefined or calculated in advance, and may transmit a configured signal. In this case, after the channel access procedure, a maximum time available for continuous signal transmission may be restricted by a maximum channel occupancy time (MCOT) defined for each country, region, or frequency band based on each unlicensed band, and even by a type of the communication device (e.g., a BS or a UE, or a master device or a slave device). For example, in a 5 GHz unlicensed band for Japan, a BS or a UE may occupy a channel to transmit a signal without performing an additional channel access procedure for up to 4 ms for an unlicensed band determined to be in an idle state.

In more detail, when the BS or the UE attempts to transmit a downlink or uplink signal in the unlicensed band, a channel access procedure that may be performed by the BS or the UE may be identified as at least one of following types.

Type 1: transmitting an uplink/downlink signal after performing a channel access procedure for a variable time Type 2: transmitting an uplink/downlink signal after performing a channel access procedure for a fixed time Type 3: transmitting an uplink or downlink signal without performing a channel access procedure A transmitting device (e.g., a BS or a UE) which attempts to transmit a signal in an unlicensed band may determine a scheme (or a type) of a channel access procedure according to a type of the signal to be transmitted. In the 3GPP, an LBT procedure that is a channel access scheme may be classified into four categories. The four categories may include a first category including a scheme that does not perform LBT, a second category including a scheme that performs LBT without random backoff, a third category including a scheme that performs LBT through random backoff in a contention window with a fixed size, and a fourth category including a scheme that performs LBT through random backoff in a contention window with a variable size. According to an embodiment, the third category and the fourth category may be reserved for Type 1, the second category may be reserved for Type 2, and the first category may be reserved for Type 3. In this case, Type 2 or the second category in which a channel access procedure is performed for a fixed time may be classified into one or more types according to the fixed time for which the channel access procedure is performed. For example, Type 2 may be classified into a type in which the channel access procedure is performed for a fixed time Aµs (e.g., 25 us) and a type in which the channel access procedure is performed for a fixed time Bµs (e.g., 16 us).

In the present disclosure, for convenience of explanation, a transmitting device may be assumed to be a BS, and the transmitting device and the BS may be interchangeably used.

For example, when a BS attempts to transmit a downlink signal including a downlink data channel in an unlicensed band, the BS may perform a channel access procedure in a scheme of Type 1. Otherwise, when the BS attempts to transmit a downlink signal that does not include a downlink data channel in an unlicensed band, e.g., when the BS attempts to transmit a synchronization signal or a downlink control channel, the BS may perform a channel access procedure in a scheme of Type 2 and may transmit a downlink signal.

In this case, a scheme of the channel access procedure may be determined according to a transmission length of a signal to be transmitted via the unlicensed band or a length of a time or a period for which the unlicensed band is occupied and used. In general, the channel access procedure in a scheme of Type 1 may be performed for a longer time than in a scheme of Type 2. Accordingly, when a communication device attempts to transmit a signal for a short time or a time equal to or less than a reference time (e.g., X ms or Y symbols), the channel access procedure may be performed in a scheme of Type 2. On the other hand, when the communication device attempts to transmit a signal for a long time or a time equal to or greater than the reference time (e.g., X ms or Y symbols), the channel access procedure may be performed in a scheme of Type 1. In other words, the channel access procedure may be performed in one of different schemes according to a use time of the unlicensed band.

When the transmitting device performs a channel access procedure in a scheme of Type 1 according to at least one of the above criteria, the transmitting device that is to transmit a signal in an unlicensed band may determine a channel access priority class (or channel access priority) according to the quality of a service class identifier (QCI) of the signal to be transmitted in the unlicensed band, and may perform the channel access procedure by using at least one of predefined configuration values as shown in Table 5 for the determined channel access priority class. Table 5 shows mapping relations between the channel access priority class and the QCI. In this case, the mapping relations between the channel access priority class and the QCI are merely examples, and the present disclosure is not limited thereto.

For example, QCIs 1, 2, and 4 refer to QCI values for services such as conversational voice, conversational video (live streaming), and non-conversational video (buffered streaming). When a signal for a service that does not match a QCI in Table 5 is to be transmitted in an unlicensed band, the transmitting device may select a QCI closest to the service from among QCIs in Table 4 and may select a corresponding channel access priority class.

TABLE 5

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

In various embodiments, parameter values for a channel access priority class (e.g., defer duration according to a determined channel access priority p, a set ($CW_p$) of contention window values or sizes, minimum and maximum values ($CW_{min,p}$, $CW_{max,p}$) of a contention window, and an available maximum channel occupancy period ($T_{mcot,p}$)) may be determined as in Table 5. Table 5 shows parameter values for channel access priority classes for downlink.

For example, a BS that attempts to transmit a downlink signal through an unlicensed band may perform a channel access procedure on the unlicensed band for a minimum time $T_f+m_p*T_{sl}$ (e.g., defer duration). When the BS attempts to perform a channel access procedure with a channel access priority class 3 (p=3), a size of $T_f+m_p*T_{sl}$, which is a size of $T_f+m_p*T_{sl}$ of the defer duration required to perform the channel access procedure, may be configured by using $m_p=3$. Tr is a fixed value of 16 us, of which a first $T_{sl}$ time during T_f should be in an idle state, and the BS may not perform the channel access procedure for the remaining time ($T_f-T_{sl}$) after the $T_{sl}$ time during the $T_f$ time. Even when the BS performs the channel access procedure for the remaining time ($T_f-T_{sl}$), the result of the channel access procedure may not be used. In other words, $T_f-T_{sl}$ refers to a time for which the BS defers performing the channel access procedure.

When it is determined that the unlicensed band is in the idle state for the whole time $m_p*T_{sl}$, N may be N−1 (N=N−1). In this case, N may be selected to be an arbitrary integer value from among values between 0 and a value ($CW_p$) in a contention window at a time to perform the channel access procedure. For the channel access priority class 3, a minimum contention window value and a maximum contention window value are 15 and 63, respectively. When the unlicensed band is determined to be in the idle state in the defer duration and additional duration during which the channel access procedure is to be performed, the BS may transmit a signal in the unlicensed band for the time $T_{mcot,p}$ (8 ms). Although the present disclosure is described by using downlink channel access priority classes for convenience of explanation, for uplink, the channel access priority classes in Table 6 may be equally used or separate channel access priority classes for uplink transmission may be used.

TABLE 6

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value $CW_p$ is a minimum value $CW_{min,p}$ of the contention window. The BS selecting N may perform the channel access procedure in the time $T_{sl}$, and when it is determined that the unlicensed band is in the idle state through the channel access procedure performed in the time $T_{sl}$, the BS may change N to N−1 (N=N−1) and when N=0, the BS may transmit a signal for up to $T_{mcot,p}$ (or maximum occupancy time) through the unlicensed band. When the unlicensed band determined through the channel access procedure is not in the idle state in the time $T_{sl}$, the BS may perform the channel access procedure again without changing the value of N.

The size of the value of the contention window $CW_p$ may be changed or maintained according to a ratio (Z) of NACK among reception results (ACK/NACK) of downlink data transmitted or reported to the BS by one or more UEs in a reference subframe, a reference slot, or a reference transmission time interval (TTI), which have received downlink data transmitted through a downlink data channel in the reference subframe, the reference slot, or the reference TTI. In this case, the reference subframe, the reference slot, or the reference duration may be determined as a time point when the BS starts a channel access procedure, a time point when the BS selects a value of N to perform the channel access procedure, a first subframe, slot, or TTI of a downlink signal transmission interval (or MCOT) involved in most recent transmission of the BS in an unlicensed band immediately before the two time points, or a start subframe, start slot, or start TTI of the transmission interval. In this case, the reference subframe, the reference slot, or the reference duration may be determined as a time point when the BS starts a channel access procedure, a time point when the BS selects an N value to perform the channel access procedure, or a time from a starting time point of a channel occupancy interval (or channel occupancy time (COT)) involved in most recent transmission of the BS in an unlicensed band immediately before the two time points to a first slot including a PDSCH in which the PDSCH is transmitted in entire PDSCH time-frequency resources scheduled by the BS for the UE through DCI. In this case, the PDSCH may be limited to a unicast PDSCH on which HARQ-ACK information is received from the UE, and when there is no unicast transmission in the reference subframe, the reference slot, or the reference duration or when there is no PDSCH transmitted in the entire PDSCH time-frequency resources scheduled through the DCI, an entire first downlink transmission interval in the channel occupancy interval involved in most recent transmission may all be the reference subframe, the reference slot, or the reference duration.

A procedure by which a UE transmits and receives an uplink/downlink signal or channel may be roughly divided into two as follows. The UE may receive DCI transmitted through a downlink control channel (e.g., PDCCH) from a BS, and may perform uplink/downlink transmission and reception (e.g., PDSCH or PUSCH) according to the received DCI. In the present disclosure, a scheme in which the UE receives DCI and performs uplink/downlink transmission and reception according to the received DCI is referred to as a first uplink/downlink transmission and reception scheme or a first transmission and reception type. Another uplink/downlink transmission and reception method is a method by which the UE may transmit and receive an uplink/downlink signal or channel according to transmission and reception configuration information configured through a higher layer signal or the like, without receiving separate DCI from the BS, and is referred to as a semi-persistent scheduling (SPS) or grant-free or configured grant scheme. In the present disclosure, a scheme in which the UE performs uplink/downlink transmission and reception, without receiving DCI, is referred to as a second uplink/downlink transmission and reception scheme or a second transmission and reception type. In this case, the second uplink/downlink transmission and reception of the UE may start after the UE receives DCI indicating activation of the second uplink/downlink transmission and reception configured through the higher layer signal from the BS. When the UE receives DCI indicating release of the second uplink/downlink transmission and reception from the BS, the UE may not perform the configured second uplink/downlink transmission and reception. The above scheme involves receiving all configuration information about the second transmission and reception type by using DCI and a higher layer signal and may be classified as the second transmission and reception type of a Type 2 scheme.

The UE may determine activation immediately after receiving a second uplink/downlink transmission and reception-related higher layer signal even without receiving separate DCI indicating activation or release of the second uplink/downlink transmission and reception of the UE. Likewise, the BS may release the second uplink/downlink transmission and reception configured for the UE through reconfiguration of the second uplink/downlink transmission and reception-related higher layer signal, and in this case, the UE may not perform the configured second uplink/downlink transmission and reception. The above scheme involves receiving all configuration information about the second transmission and reception type by using only a higher layer signal and may be classified as the second transmission and reception type of a Type 1 scheme.

The second transmission and reception type is divided into uplink and downlink and will be described in more detail as follows.

A downlink second transmission and reception type is a method by which a BS periodically transmits a downlink data channel based on information configured through higher layer signaling without transmitting DCI to a UE. The downlink second transmission and reception type is mainly used to transmit VoIP or periodically generated traffic, and because the downlink second transmission and reception type may transmit a downlink data channel without transmitting DCI, overhead may be minimized.

The UE may receive, through a higher layer signal, at least one of the following configuration information for downlink reception of the second transmission and reception type from the BS.

Periodicity: period of the second transmission and reception type nrofHARQ-Processes: the number of HARQ processes configured for the second transmission and reception type n1PUCCH-AN: HARQ resource configuration information for transmitting, to the BS, a reception result for a PDSCH received in the second transmission and reception type mcs-Table: MCS table configuration information applied to transmission of the second transmission and reception type Likewise, the UE may receive, through a higher layer signal, the following configuration information for uplink transmission of the second transmission and reception type from the BS.

frequencyHopping: field indicating whether hopping is intra-slot hopping or inter-slot hopping, where when the field does not exist, frequency hopping is disabled cg-DMRS-Configuration: DMRS configuration information mcs-Table: field indicating whether 56QAM MCS table or new64QAM MCS table is used during PSCH transmission with no transform precoding, where when the field does not exist, 64QAM MCS table is used mcs-TableTransformPrecoder: field indicating MCS table used by the UE during transform precoding-based PUSCH transmission, where when the field does not exist, 64QAM MCS table is used uci-OnPUSCH: applying betta-offset in either a dynamic or semi-static way resourceAllocation: configuring whether resource allocation type is 1 or 2 rbg-Size: determining one of two configurable RBG sizes powerControlLoopToUse: determining whether closed loop power control is applied p0-PUSCH-Alpha: applying Po, PUSCH alpha value transformPrecoder: configuring whether transformer precoding is applied, where when the field does not exist, msg3 configuration information is followed nrofHARQ-Processes: the number of configured HARQ processes repK: the number of repeated transmissions repK-RV: RV pattern applied to each repeated transmission during repeated transmission, where when the number of repeated transmissions is 1, the field is disabled periodicity: transmission period, from at least two symbols to 640 to 5120 slots according to a maximum subcarrier spacing configuredGrantTimer: timer for ensuring retransmission and including a plurality of periodicity units In this case, in the case of type 1 of the second transmission and reception type, the UE may additionally receive the following configuration information through a higher layer signal (e.g., rrc-ConfiguredUplinkGrant) from the BS. In this case, in the case of type 2 of the second transmission and reception type, the UE may receive at least one of the following configuration information through DCI.

timeDomainOffset: value indicating a first slot in which uplink transmission of the second transmission and reception type starts, and slot-based information based on system frame number (SFN) 0 timeDomainAllocation: field indicating an uplink transmission time resource domain of the second transmission and reception type, startSymbolAndLength or SLIV frequencyDomainAllocation: field indicating an uplink transmission frequency resource domain of the second transmission and reception type antennaPort: antenna port configuration information applied to uplink transmission of the second transmission and reception type dmrs-SeqInitialization: field configured, when transform precoder is disabled precodingAndNumberOfLayers srs-ResourceIndicator: field indicating SRS resource configuration information mcsAndTBS: MCS and TBS applied to uplink transmission of the second transmission and reception type frequencyHoppingOffset: frequencyhoppingoffset value pathlossReferenceIndex In the present disclosure, all configuration information for transmission of the second transmission and reception type may be configured for each Pcell or Scell, and may also be configured for each frequency band (BWP). Also, transmission of one or more second transmission and reception types may be configured for each BWP for each specific cell.

A method by which a UE determines an uplink transmission resource of the second transmission and reception type (hereinafter, second uplink transmission resource) will be described as follows.

The UE may be configured with period information P and an offset value for a second uplink transmission resource through a higher layer signal from a BS. In this case, each of the period or the offset value may be at least one unit from among an absolute time (e.g., ms), a slot, or a symbol, and generally, the offset value may be equal to or less than the period and units of the period and the offset value may be different from each other. Also, the offset value may be an offset value based on a specific time (e.g., system frame number 0).

In this case, in the case of second uplink transmission of type 2, the UE may receive the offset information through DCI for activating the second uplink transmission of type 2. In this case, the offset value may be an offset value based on a slot for receiving the DCI.

Figure 9:
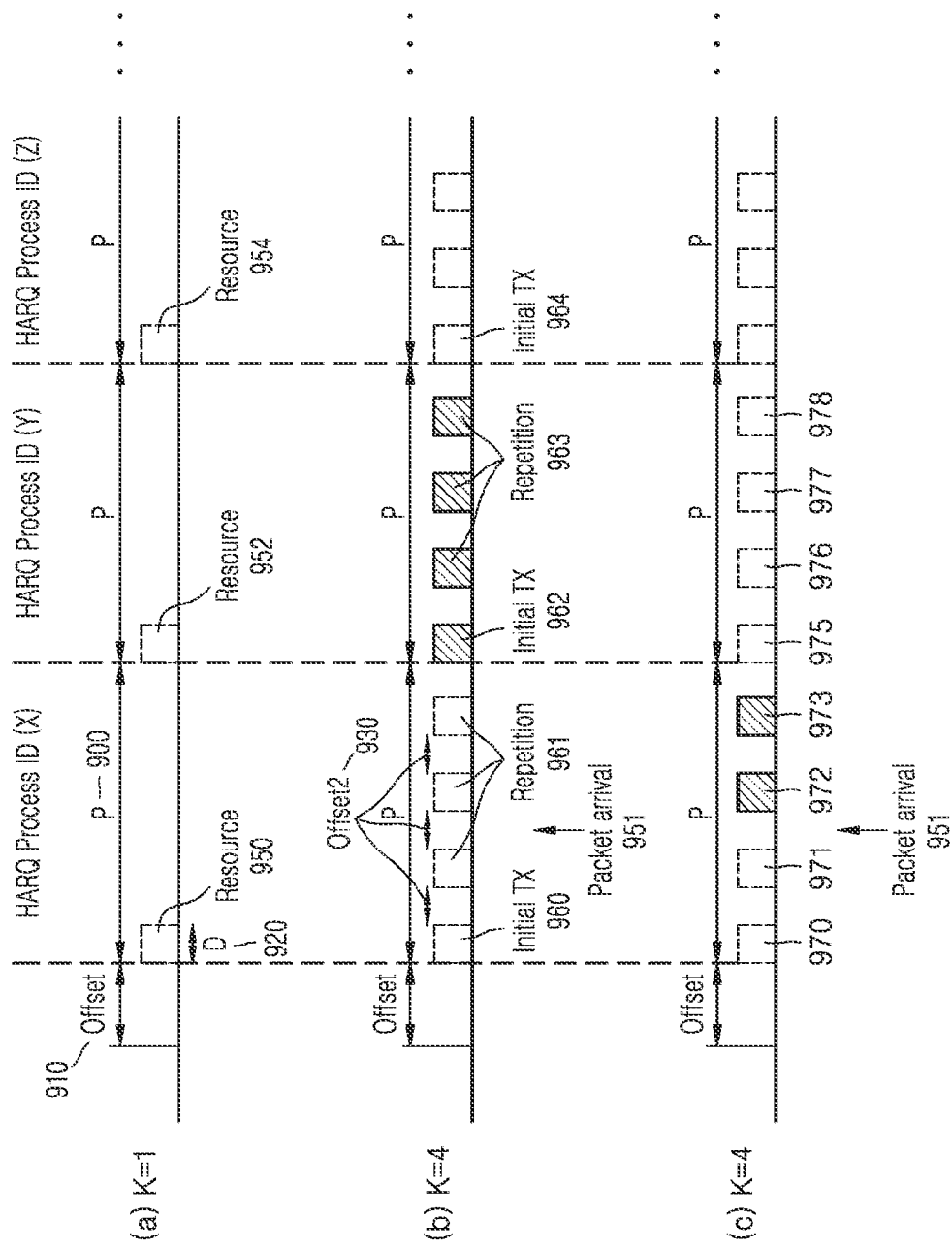
FIG. 9 is a diagram illustrating another frequency resource allocation method in a wireless communication system, according to various embodiments of the present disclosure.

FIG. 9 will be described as an example.

A UE may be configured with a period 900 and an offset value 910 for a second uplink transmission resource through a higher layer signal from a BS. In this case, the offset value 610 is a value based on a specific time (e.g., system frame number 0), a slot corresponding to the specific time, or a slot in which DCI for activating second uplink transmission is received. The UE may determine $N^{th}$ uplink transmission resources (950, 952, 954, . . . ) through the period 900 and the offset 910 configured through the higher layer signal, which are expressed by using Equations as follows. Equation 2 is an equation of determining a second uplink transmission resource of type 1.

$$[(SFN \times numberOfSlotsPerFrame \times numberOfSymbolsPerSlot) + (\text{slot number in the frame} \times numberOfSymbolsPerSlot) + \text{symbol number in the slot}] = (timeDomainOffset \times numberOfSymbolsPerSlot + symbolstart + N \times periodicity) \bmod (1024 \times numberOfSlotsPerFrame \times numberOfSymbolsPerSlot), \text{ for all } N \geq 0 \qquad [\text{Equation 2}]$$

Equation 3 is an equation of determining a second uplink transmission resource of type 2.

[(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame× numberOfSymbolsPerSlot+slotstart time×numberOfSymbolsPerSlot+symbolstart time)+N× periodicity]modulo (1024× numberOfSlotsPerFrame× numberOfSymbolsPerSlot), for all N>=0.   [Equation 3]

numberOfSlotsPerFrame denotes the number of slots included for 10 ms or a radio frame defined or configured in a carrier or cell in which second uplink transmission is configured, and SFN_start time and slot_start time are slots receiving DCI indicating start or activation of the second uplink transmission. In this case, the offset value is a value configured through a higher layer signal (in the case of Equation 2), or a value received through time domain resource allocation information included in the DCI for starting or activating the second uplink transmission (in the case of Equation 3).

In this case, the UE may be configured to repeatedly transmit one TB up to repK times through a second uplink transmission scheme. repK is a value that may be configured through a higher layer signal. The UE configured with the repK value or the UE whose repK value is greater than 1 may repeatedly transmit a TB repK times. In this case, the UE may be configured with a maximum value of the repK value through a higher layer signal, and may receive repk' that is a value indicating the number of times the UE should repeatedly transmit in DCI for activating the second uplink transmission scheme. In this case, repK' may be equal to or less than repK. In this case, repK is the number of transmissions including first transmission or initial transmission of a TB transmitted through the second uplink transmission scheme, and may have one of values including 1 (e.g., repK=1, 2, 4, 8). In this case, a value of repK is merely an example, and the present disclosure is not limited thereto.

A case where repK=4 will be described with reference to (b) of FIG. 9 as follows. The UE may determine a resource that may be transmitted in a second uplink transmission scheme by using Equations 2 and 3. The UE configured to repeatedly transmit a TB transmitted through the second uplink transmission scheme, in other words, the UE whose repK value is greater than 1, is configured with repK resources in the configured period P 900 as shown in (b) of FIG. 9. In this case, it may be determined that consecutively repK−1 repeated transmission resources are configured based on an initial transmission or first transmission resource or a resource corresponding to repK=1. In this case, repeated transmission resources may be determined by adding an offset between repeated transmissions through an additional offset 930. The additional offset 930 may be received by the UE through DCI for activating the second uplink transmission scheme or a higher layer signal. In this case, the additional offset 930 may be a value of a symbol unit including 0, a slot unit including 0, or an absolute time (μs or ms unit).

In this case, the UE may be configured, through a higher layer signal, with one or more HARQ process IDs for uplink transmission transmitted through the configured second uplink transmission scheme, and the HARQ process IDs may be calculated by using the following equation for the configured resource.

HARQ Process ID=[floor(CURRENT_symbol/periodicity)]modulo nrofHARQ-Processes   [Equation 4]

CURRENT_symbol=(SFN×numberOfSlotsPerFrame× numberOfSymbolsPerSlot+slot number in the frame×numberOfSymbolsPerSlot+symbol number in the slot), and numberOfSlotsPerFrame and numberOfSymbolsPerSlot are respectively the number of consecutive slots constituting a frame and the number of consecutive symbols constituting a slot. nrofHARQ-Processes is the number of HARQ processes which the UE receives from the BS for uplink transmission through the second uplink transmission scheme through a higher layer signal from the BS, and generally has a value from 1 to 16. CURRENT_symbol is an index of a first symbol for initial transmission during repK repeated transmissions.

Referring to 9(b), an HARQ process ID for repK repeated transmissions (960 and 961) is X and is determined through a first resource 960 in a period and Equation 4. An HARQ process ID for initial transmission (962) and repeated transmission (963) in a next period is Y. In other words, an HARQ process ID may be determined by using Equation 4 based on a time (slot or symbol) at which initial transmission is performed during the repK transmissions. As a result, HARQ process IDs for uplink transmission resources transmitted in a second uplink transmission scheme included in the configured period P are the same.

In the second uplink transmission scheme, because the UE may transmit a pre-configured uplink resource when uplink transmission is required, an uplink transmission delay time may be greatly reduced. Accordingly, when second uplink transmission should start in a first resource configured in each HARQ process ID or period in which repK transmissions are configured, e.g., the resource 960, 962, or 964 of FIG. 9(b), uplink transmission delay occurs. In other words, even when data to be transmitted through uplink arrives (951), the UE may wait until the resource 962 that is a first resource of a next period to start second uplink transmission and then may perform uplink transmission. However, in contrast, when the UE may start transmission in any resource configured in each HARQ process ID or period in which repK transmissions are configured, the complexity of the BS to perform reception is excessively increased. In order to solve the problems, the UE may start transmission in a resource in which an RV configured to be transmitted through the second uplink transmission scheme is set to a specific value r (e.g., 0), or may start at a time (slot or symbol) for a first configured resource in the period P from among resources in which the configured RV is set to a specific value r (e.g., 0). The UE may determine that an RV for $n^{th}$ transmission among repK transmissions is a (mod (n−1,4)+1)$^{th}$ value among repK-RV values, in a configured RV sequence. Here, n=1, 2, . . . , K. Accordingly, in FIG. 9(c), when repK-RV is 0-3-0-3, from among second uplink transmission resources 970, 971, 972, and 973 of the HARQ process ID X, an RV of the first resource is 0, an RV of the second transmission resource 971 is 3, an RV of the third resource is 0, and an RV of the fourth transmission resource 971 is 3. When second uplink transmission may start in a resource whose RV is set to 0, immediately after data requiring uplink transmission arrives, from among the resources 970 and 972, the UE may start second uplink transmission in the resource 972 that may perform transmission most rapidly.

The BS may cause the UE not to perform second uplink transmission using a second uplink transmission resource through one of the following methods or a combination thereof, for a least one of second uplink transmission resources pre-configured for the UE. In other words, the UE configured with second uplink transmission may not perform second uplink transmission using a second uplink transmission resource through one of the following methods or a combination thereof.

Condition 1: When a configured second uplink transmission resource and a first uplink transmission resource overlap in at least one symbol, the UE may not perform second uplink transmission in the second uplink transmission resource and may perform uplink transmission by using the scheduled first uplink transmission resource.

Condition 2: When at least one symbol among a configured second uplink transmission resource is indicated as a downlink symbol or a flexible symbol through a slot format indicator (or DCI format 2_0) (or is indicated as a symbol other than an uplink symbol), the UE may not perform second uplink transmission in the second uplink transmission resource. In this case, a minimum processing time (T_proc,2) may be required until the UE receives the slot format indicator transmitted through a downlink control channel from the BS and determines that at least one symbol among the second uplink transmission resource configured through the received slot format indicator information is indicated as a downlink symbol or a flexible symbol. In this case, the UE may have performed second uplink transmission within the minimum processing time (T_proc,2) after a last symbol of a CORESET in which the slot format indicator is transmitted. However, the UE should not perform the second uplink transmission immediately after obtaining the slot format indicator information as in Condition 2 (after T_proc,2).

Condition 3: When at least one symbol among a configured second uplink transmission resource is cancelled through an uplink/downlink transmission cancellation indicator (or preemption indication), the UE may not perform transmission in the second uplink transmission resource. When there exists a symbol overlapping a symbol indicated to cancel uplink transmission through DCI from among symbols of the second uplink transmission resource, the uplink transmission cancellation indicator may indicate to cancel transmission corresponding to the second uplink transmission resource. In detail, transmission corresponding to the second uplink transmission resource may be cancelled from the symbol indicated to cancel uplink transmission through the DCI.

Condition 4: When a channel is not accessed until a resource configured as a second uplink transmission resource starts, the UE may not perform transmission in the second uplink transmission resource. Referring to FIG. 9(c), a case where the UE performs second uplink transmission through an unlicensed band will be described as an example. When data to be transmitted through uplink arrives (951), the UE may perform second uplink transmission through a resource that may perform second uplink transmission after the data arrival, that is, the resource 972. In this case, the UE may perform a channel access procedure on the unlicensed band through which the UE is to perform transmission before the resource 972 is transmitted, and when the unlicensed band is determined to be in an idle state, may perform second uplink transmission through the resource 972. When it is determined that the unlicensed band is not in an idle state, the UE may not perform at least second uplink transmission through the resource 972. Condition 5: When at least one resource (symbol unit, RE unit, or PRB unit) among a first uplink transmission resource scheduled through DCI1 overlaps a first uplink transmission resource scheduled through another DCI (DCI2) in a symbol unit, an RE unit, or a PRB unit, the UE may not perform first uplink transmission in the first uplink transmission resource first scheduled through the DCI1. In this case, a minimum processing time (T_proc,2) may be required until the UE receives the scheduling information (DCI2) transmitted through a downlink control channel from the BS and determines that at least one symbol among the first uplink transmission resource configured through the received DCI2 overlaps the first uplink transmission resource scheduled through the DCI1. In this case, the UE may have performed first uplink transmission scheduled according to the DCI1 within the minimum processing time (T_proc, 2) after a last symbol of a CORESET in which the DCI2 is transmitted. However, the UE should not perform the first uplink transmission scheduled according to the DCI1 immediately after obtaining the DCI2 as in Condition 2 (after T_proc, 2).

A processing time 1070 is a time required until the UE receives uplink scheduling information from the BS and performs uplink signal transmission according to the received scheduling information. In other words, the processing time is a time from immediately after a last symbol of a PDCCH in which the uplink scheduling information is transmitted to immediately before a first symbol of the uplink signal transmission according to the scheduling information, and should be equal to or greater than the minimum time required by the UE for the processing. In the present disclosure, the processing time may be a time required until the UE receives a PDCCH and properly obtains slot formation indicator information transmitted from the BS through the PDCCH.

In this case, because a 5G or NR system generally performs transmission and reception in units of symbols, the minimum processing time may be expressed with the minimum number of symbols from immediately after a last symbol of a PDCCH in which uplink scheduling information is transmitted to immediately before a first symbol of uplink signal transmission according to the scheduling information. In other words, when the first symbol of the uplink signal transmission starts immediately after the last symbol of the PDCCH for scheduling the uplink signal transmission and before an $L_2$ symbol, the UE may not be able to transmit an uplink signal, and thus may ignore the uplink scheduling information. In this case, $L_2$ is a first symbol in which a cyclic prefix (CP) starts immediately after the last symbol of the PDCCH for scheduling the plink signal transmission and before the $L_2$ symbol in which transmission starts after Equation 5. In this case, in the above time, a symbol of the UE may include a timing advance, and a time difference effect between a plurality of carriers or cells.

$$T_{proc,2} = \max((N_2 + d_{2,1})(2048 + 144) \cdot \kappa 2^{-\mu} \cdot T_c, d_{2,2}) \quad \text{[Equation 5]}$$

Where, $N_2$ may be a value determined according to UE processing capability and a subcarrier spacing of Table 7 and Table 8. $\mu = 0, 1, 2, 3$ respectively denote subcarrier spacings of 15 kHz, 30 kHz, 60 kHz, and 120 KHz. Here, u is a subcarrier spacing that produces a largest $T_{proc,2}$ value as a result of Equation 5, from among a subcarrier spacing of a PDCCH in which uplink scheduling information is transmitted and a subcarrier spacing of a PUSCH.

When only a DM-RS is transmitted in a first symbol of an uplink signal, $d_{2,1} = 0$, and otherwise, $d_{2,1} = 1$. Also, when the uplink scheduling information indicates BWP switching, $d_{2,2}$ is equal to a time required for the UE to switch a BWP. When the uplink scheduling information does not indicate BWP switching, $d_{2,2} = 0$.

TABLE 7

| μ | PUSCH preparation time N2 [symbols] |
|---|---|
| 0 | 10 |
| 1 | 12 |
| 2 | 23 |
| 3 | 36 |

TABLE 8

| μ | PUSCH preparation time N2 [symbols] |
|---|---|
| 0 | 5 |
| 1 | 5.5 |
| 2 | 11 for frequency range 1 |

[Table 7] shows an $N_2$ value provided in UE capability 1, and [Table 8] shows an $N_2$ value provided in UE capability 2. The UE supporting the capability 2 may be configured to apply a processing time of one of Tables 7 to 8 through a higher layer signal. For example, when processingType2Enabled of PUSCH-ServingCellConfig is enabled, a processing time may be applied according to the $N_2$ value provided in the UE capability 2 of Table 8, and otherwise, a processing time may be applied according to the $N_2$ value provided in the UE capability 1 of Table 7.

k and $T_c$ are defined as follows.

$$T_c = 1/(\Delta f_{max} \cdot N_f), \Delta f_{max} = 480 \cdot 10^3 \text{ Hz}, N_f = 4096, \kappa = T_s/T_c = 64, T_s = 1/(\Delta f_{ref} \cdot N_{f,ref}), \Delta f_{ref} = 15 \cdot 10^3 \text{ Hz}, N_{f,ref} = 2048$$

Figure 10:
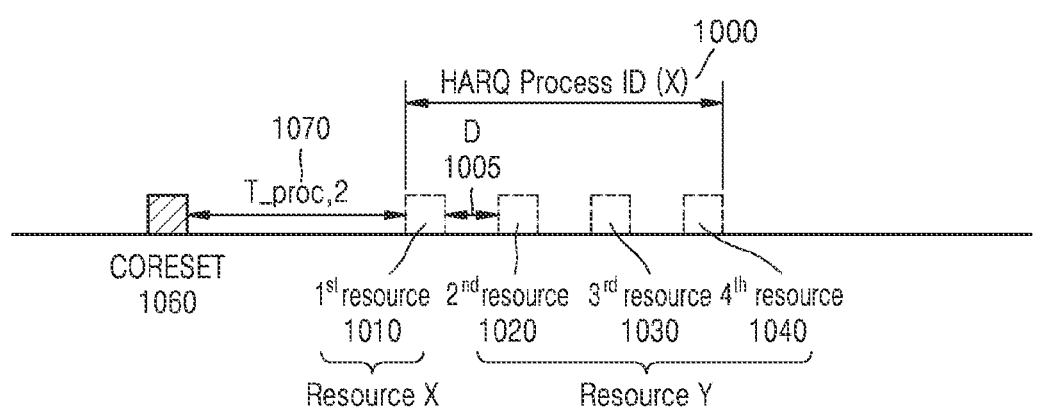
FIG. 10 is a diagram for describing a method of performing second uplink transmission through a second uplink transmission resource, according to an embodiment of the present disclosure.

When a second uplink transmission resource (hereinafter, referred to as resource X for convenience of explanation) satisfying at least one of the above conditions and not performing second uplink transmission is an $x^{th}$ transmission resource from among resources having the same HARQ process ID or a period of a configured second uplink resource, the UE may perform or may not perform second uplink transmission through a second uplink transmission resource (hereinafter, referred to as resource Y for convenience of explanation) after the transmission resource. This will be described with reference to FIG. 10 as follows. In FIG. 10, it is assumed that repK-RV is 0-3-0-3 and x=1 for convenience of explanation.

Transmission Method 1: The UE may (re) start second uplink transmission in a first resource from among resources after a resource X 1010 (e.g., a first resource 1020 from among resources Y 1020, 1030, and 1040). According to Transmission Method 1, the UE may (re) start second uplink transmission even in a resource other than a resource whose RV is set to r (e.g., r=0). Even when the UE is to transmit in a second uplink transmission scheme in the resource X 1010 but actual transmission is not performed due to at least one of the conditions, the UE may (re) start second uplink transmission in a resource other than a resource whose RV is set to r (e.g., r=0), for example, a first resource from among the resources Y. In other words, Transmission Method 1 is a method of determining a resource in which the UE may (re) start second uplink transmission according to a transmission attempt or plan of the UE instead of actual transmission.

Transmission Method 2: The UE may re (start) second uplink transmission in a first resource that is set to RV=r from among resources after the resource X 1010 (e.g., the first resource 1030 that is set to RV=0 from among the resources Y). According to Transmission Method 2, the UE may (re) start second uplink transmission in a resource whose RV is set to r (e.g., r=0). Because the UE is to transmit in a second uplink transmission scheme in the resource X 1010 but actual transmission is not performed due to at least one of the conditions, the UE (re) starts second uplink transmission in the resource 1030 whose RV is set to r (e.g., r=0). In other words, Transmission Method 2 is a method of determining a resource in which the UE may (re) start second uplink transmission based on actual transmission.

Transmission Method 3: When the UE performs second uplink transmission in at least K symbols (e.g., K=1) among the resource X or resources before the resource X 1010, the UE may (re) start second uplink transmission in a first resource from among resources after the resource X (e.g., a first resource from among the resources Y). In this case, the K symbols are merely an example, and a resource in which the UE may (re) start second uplink transmission may be determined based on a time less than a symbol or a specific time value. For example, it is assumed that the whole or a part of the second uplink transmission first resource 1010 is indicated as a downlink symbol or a flexible symbol through a slot format indicator. In this case, when a time from a last symbol of a CORESET 1060 in which the slot format indicator is transmitted to immediately before a start symbol of the second uplink transmission first resource 1010 is less than T_proc,2 1070, the UE may have performed second uplink transmission from the second uplink transmission first resource 1010 to T_proc,2 1070. In this case, the UE does not perform second uplink transmission from a time after T_proc,2 1070 to a last symbol of the second uplink transmission first resource 1010. Next, the UE may (re) start second uplink transmission in a first resource from among resources after the resource X 1010 (e.g., the first resource 1020 from among the resources Y).

Transmission Method 4: When there is a resource that is set to RV=r from among resources after the resource X 1010 (e.g., the resource 1030 that is set to RV=0 from among the resources Y), the UE may (re) start second uplink transmission by using Transmission Method 1 or Transmission Method 2. For example, when repK=4 and repK-RV=0-3-0-3, and first transmission from among repK repeated transmissions is determined to be the resource X 1010 due to the conditions, because the resource 1030 that is set to RV=0 is included in the resources Y 1020, 1030, and 1040, the UE may (re) start second uplink transmission from the second resource 1020 through Transmission Method 1 or may (re) start second uplink transmission from the third resource (RV=0) through Transmission Method 2. In another example, when repK=2 and repK-RV=0-3-0-3 (which is the same as repK-RV=0-3), and first transmission from among repK repeated transmissions is determined to be the resource X 1010 due to the conditions, because a resource that is set to RV=0 is not included in the resource Y 1020, the UE may not (re) start second uplink transmission.

Transmission Method 5: When a second uplink transmission resource (resource X) satisfying at least one of the above conditions and not performing second uplink transmission is the first transmission resource 1010 having the same HARQ process ID or a period of a configured second uplink resource, the UE does not perform second uplink transmission through second uplink transmission resources (the resources Y, 1020, 1030, and 1040) after the transmission resource.

Although a resource that is set to RV=0 is determined to be a resource in which the UE (re) starts second uplink transmission in the above method, this is merely an example, and a resource that is set to RV=3 or a resource that is set to an RV other than 0 and 3 may be determined to be a resource in which the UE (re) starts second uplink transmission. Also, although determination is made by using Tproc,2, this is merely an example, and the conditions and the transmission methods may be applied by using a value other than Tproc,2, or a reference processing time value D configured through a higher layer signal from the BS.

The transmission methods may be determined according to the conditions. For example, in the case of Condition 1, Transmission Method 5 may be followed, and in the case of Condition 2, Transmission Method 2 to Transmission Method 3 may be followed. Likewise, in the case of Condition 3, Transmission Methods 1 to 5 may be followed, and in the case of Condition 4, Transmission Method 1 may be followed. The transmission methods according to the conditions are merely an example, and the present disclosure is not limited thereto. Also, although uplink transmission and reception has been mainly described in the present disclosure, downlink transmission and reception may be performed according to at least one condition and transmission method from among the conditions and transmission methods.

As a simple example, a downlink transmission and reception method will be described as follows. The UE may be scheduled with downlink data channel reception through a first downlink transmission and reception method through DCI1 from the BS. When the UE is configured through a higher layer signal from the BS to repeatedly receive a downlink data channel N times (e.g., pdsch-AggregationFactor), the UE may receive the downlink data channel in one or more slots. In this case, the present disclosure may be applied not only to the case of repeatedly receiving N times but also to the case where N different TBs are transmitted through different PDSCHs.

The UE may be scheduled with another downlink data channel through the first downlink transmission and reception method through another DCI2 from the BS. For example, when there is information to be urgently transmitted such as URLLC, the BS needs to rapidly transmit the emergency information. In this case, DCI1 and DCI2 may be different DCI formats, the DCI1 and DCI2 may be the same DCI format but whether DCI received by the UE is DCI1 or DCI2 may be determined through a delimiter bit or the like, or whether DCI received by the UE is DCI1 or DCI2 may be determined by differently configuring a CORESET or a search space in which the DCI is transmitted. It is assumed that DCI2 is DCI for scheduling a downlink data channel having a higher priority than DCI1. In this case, the UE may determine that most recently received DCI (e.g., DCI2) has a higher priority than previously received DCI (e.g., DCI1).

When at least one resource (symbol unit, RE unit, or PRB unit) or an $x^{th}$ resource from among first uplink transmission resources scheduled through DCI1 overlaps a first uplink transmission resource scheduled through another DCI (DCI2) in a symbol unit, an RE unit, or a PRB unit, the UE may receive a downlink data channel scheduled by the BS through one of Transmission Methods 1 through 5 or a combination thereof, and/or one of the following reception methods or a combination thereof.

Reception Method A: The UE does not perform a decoding operation on a PDSCH received in a resource x. The UE may transmit, to the BS, HARQ-ACK for a PDSCH received before the resource x or HARQ-ACK feedback information determined by using the PDSCH received before the resource x. The UE may not receive any PDSCH after the resource x, or may receive the PDSCH but may not perform decoding, and may not transmit, to the BS, HARQ-ACK feedback information on the PDSCH.

Reception Method B: The UE does not perform a decoding operation on a PDSCH received in a resource x. The UE may transmit, to the BS, HARQ-ACK for a PDSCH received before the resource x or HARQ-ACK or HARQ-ACK feedback information on each PDSCH obtained by using the PDSCH received before the resource x and a PDSCH received after the resource x. That is, the UE may not receive a PDSCH in the resource x, may receive the PDSCH but may not perform decoding, or may not transmit HARQ-ACK feedback information.

Reception Method C: The UE may not perform decoding on not only a PDSCH received in a resource x but also a PDSH received before the resource x. The UE may not transmit HARQ-ACK feedback information on the received PDSCH to the BS. The UE may not receive any PDSCH after the resource x or may receive the PDSCH but may not perform decoding, and may not transmit HARQ-ACK feedback information on the PDSCH to the BS.

Figure 11:
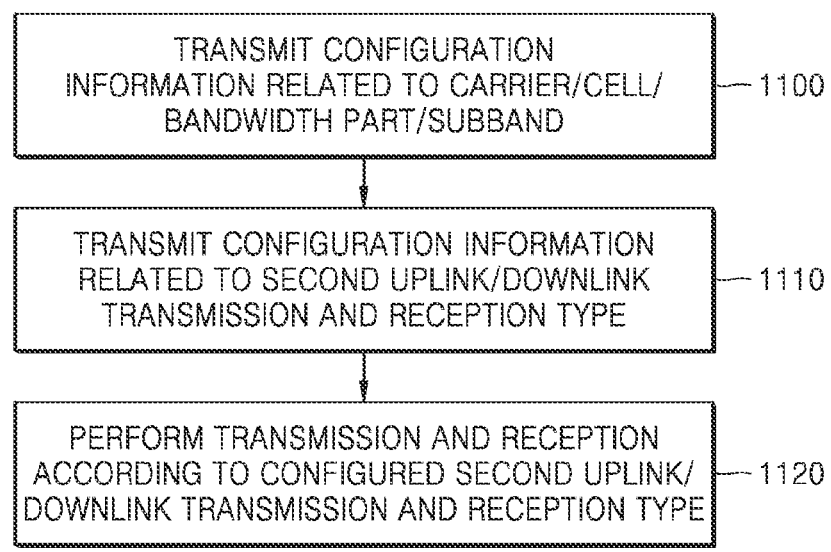
FIG. 11 is a diagram for describing an operation of a base station, according to an embodiment of the present disclosure.

FIG. 11 is a diagram illustrating an operation of a base station, according to the present disclosure. Referring to FIG. 11, although not shown, a base station may transmit, to a UE, configuration information related to uplink/downlink transmission and reception including a maximum number of HARQ processes that may be configured for the UE and the maximum number of TBs that may be transmitted. Also, although not shown in FIG. 11, the base station may receive, from the UE, through a capability information report, capability information such as a waveform of an uplink/downlink transmission and reception signal that may be supported by the UE, for example, a supported waveform from among CP-OFDM-based waveforms and DFT-s-OFDM-based waveforms.

The base station may transmit, through a higher layer signal, to the UE, information related to an uplink/downlink transmission and reception frequency band and bandwidth such as a carrier or cell or a BWP of the carrier or cell (1100). Also, the base station may determine a type suitable for uplink/downlink signal transmission and reception, and may configure a plurality of uplink/downlink signal transmission and reception types for the UE according to the determination. In this case, an uplink transmission and reception type and a downlink transmission and reception type may be the same or different from each other, and may be independently configured. For example, the base station may configure the UE to use only a first downlink transmission type as the downlink transmission and reception type and use a first uplink transmission type and a second uplink transmission type as the uplink transmission and reception type. Also, a plurality of second uplink transmission types may be configured. In this case, a second uplink transmission type may be configured as at least one of a type 1 second uplink transmission type or a type 2 second uplink transmission type.

The base station may determine valid resources for second uplink/downlink transmission and reception through at least one information from among configuration information about the uplink/downlink transmission type configured for the UE, uplink/downlink transmission and reception scheduling information of first type, slot format indicator information, uplink/downlink transmission and reception cancellation indicator information, and channel access procedure result information, and may accordingly perform uplink/downlink transmission and reception (1120).

All of the steps do not have to be performed sequentially, and specific steps may be omitted or the described order may be changed.

Figure 12:
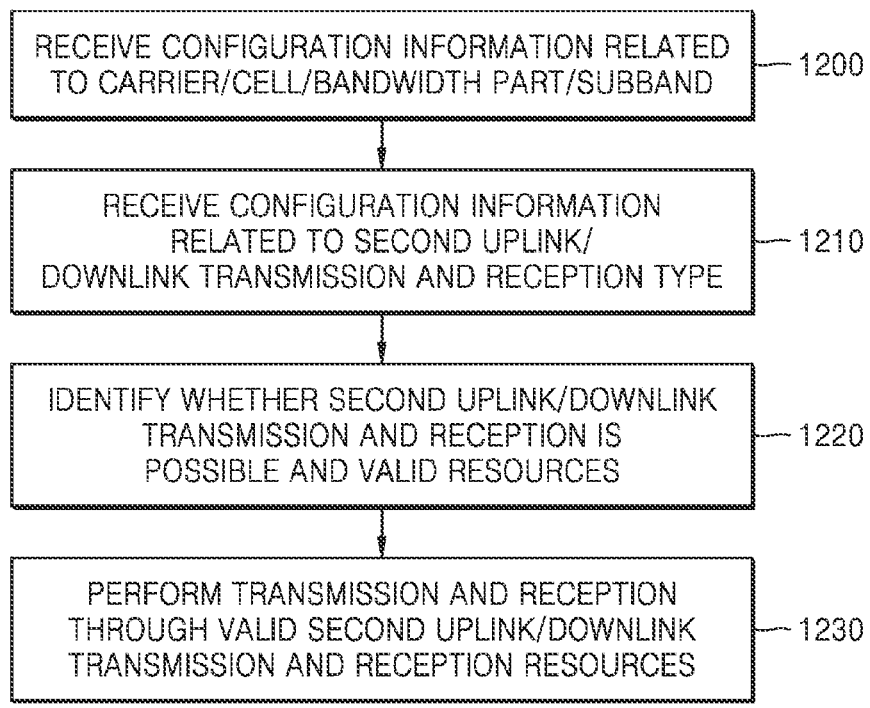
FIG. 12 is a diagram for describing an operation of a terminal, according to an embodiment of the present disclosure.

FIG. 12 is a diagram illustrating an operation of a UE, according to the present disclosure. Referring to FIG. 12, a UE is configured with information related to an uplink/downlink transmission and reception frequency band and bandwidth such as a carrier or cell or a BWP of the carrier or cell from a base station (1200). The configuration may be performed through a higher layer signal, and the configuration information may include at least one information from among a size of a BWP, the number of PRBs included in the BWP, and a start position of a PRB included in the BWP. Although not shown in FIG. 12, the UE may transmit, to the base station, through a capability information report, capability information such as an uplink/downlink transmission and reception waveform that may be supported by the UE. Also, separately or together with operation 1200, the UE may be configured, through a higher layer signal, with a maximum number of configurable HARQ processes and a maximum number of transmittable TBs from the base station.

The UE may receive configuration information related to uplink/downlink signal transmission and reception (1210). In this case, an uplink transmission and reception type and a downlink transmission and reception type may be configured to be the same or different from each other, and may be configured independently. For example, the UE may be configured to use only a first downlink transmission type as the downlink transmission and reception type and use a first uplink transmission type and a second uplink transmission type as the uplink transmission and reception type. Also, the UE may be configured with a plurality of second uplink transmission types, and a second uplink transmission type may be configured as at least one of a type1 second uplink transmission type or a type 2 second uplink transmission type. Additionally, the UE may receive configuration information such as second uplink/downlink transmission and reception configuration information, for example, a period, the number of repeated transmissions, and an RV sequence (1210).

The UE may determine whether a configured second uplink/downlink resource corresponds to at least one of Conditions 1 through 5 of the present disclosure or a combination thereof through at least one information from among uplink/downlink transmission and reception scheduling information of first type, slot format indicator information, uplink/downlink transmission and reception cancellation indicator information, and channel access procedure result information which are received from the base station (1220), and may perform transmission and reception through valid second uplink/downlink transmission and reception resources determined according to at least one of Transmission Methods 1 through 5 of the present disclosure or a combination thereof (1230).

All of the steps do not have to be performed sequentially, and specific steps may be omitted or the described order may be changed.

In the present disclosure, the expressions such as "equal to or greater than" or "equal to or less than" are used to determine whether a particular condition (or criterion) is fulfilled, but the expressions may not exclude meaning of "exceeding" or "less than". A condition written with "equal to or greater than" may be replaced with "exceeding", a condition with "equal to or less than" may be replaced with "less than", and a condition with "equal to or greater than . . . and less than . . . " may be replaced with "exceeding . . . and equal to or less than . . . ".

Methods according to the claims or embodiments of the present disclosure described herein may be implemented by hardware, software, or a combination of hardware and software.

When the methods are implemented by software, a computer-readable storage medium storing one or more programs (software modules) may be provided. The one or more programs stored in the computer-readable storage medium are configured to be executed by one or more processors in an electronic device. The one or more programs include instructions for allowing the electronic device to execute the methods according to the claims or the embodiments of the present disclosure.

The programs (e.g., software modules or software) may be stored in a non-volatile memory including a random access memory (RAM) or a flash memory, a read-only memory (ROM), an electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in a memory including any combination of some or all of the above storage media. Also, each of the memories may include a plurality of memories.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may access, via an external port, the electronic device for performing embodiments of the present disclosure. Furthermore, an additional storage device on the communication network may access the electronic device for performing embodiments of the present disclosure.

The present disclosure relates to a method and apparatus for performing repeated transmission and reception in a wireless communication system. According to a method of performing repeated transmission and reception according to an embodiment of the present disclosure, a terminal may receive configuration information about at least one of a carrier, a cell, a BWP, and a subband, may receive configuration information about a grant-free uplink/downlink transmission and reception type, may identify whether grant-free uplink/downlink transmission and reception is possible and valid resources based on the configuration information about the grant-free uplink/downlink transmission and reception type, and may perform grant-free uplink/downlink transmission and reception through the valid resources according to a result of the identifying. According to an embodiment of the present disclosure, a method of a terminal in a wireless communication system includes: determining a plurality of temporally sequential uplink transmission resources to repeatedly transmit a transmission block through configured grant-based uplink transmission; identifying a first uplink transmission resource corresponding to first initial transmission for the transmission block from among the determined plurality of uplink transmission resources; when the first initial transmission is cancelled, identifying a second uplink transmission resource corresponding to second initial transmission for the transmission block based on uplink transmission resource candidates following the identified first uplink transmission resource; and performing the second initial transmission through the identified second uplink transmission resource.

According to an embodiment, a redundancy version corresponding to the identified first uplink transmission resource may be set to zero.

According to an embodiment, the second uplink transmission resource is an uplink transmission resource immediately following the first uplink transmission resource.

According to an embodiment, a redundancy version corresponding to the uplink transmission resource immediately following the first uplink transmission resource is set to non-zero.

According to an embodiment, the second uplink transmission resource may be a first uplink transmission resource from among one or more uplink transmission resources whose redundancy version is set to zero from among the uplink transmission resource candidates.

According to an embodiment, the first initial transmission may be cancelled by an uplink transmission cancellation indicator.

According to an embodiment, the first initial transmission may be cancelled when at least one of symbols included in the first uplink transmission resource is indicated by the slot format indicator as a downlink symbol or a flexible symbol.

According to an embodiment, the first initial transmission may be cancelled when at least one symbol included in the first uplink transmission resource overlaps at least one symbol of an uplink transmission resource based on scheduling information for uplink data.

According to an embodiment of the present disclosure, a terminal in a wireless communication system includes: a transceiver; and at least one processor configured to determine a plurality of temporally sequential uplink transmission resources to repeatedly transmit a transmission block through configured grant-based uplink transmission, identify a first uplink transmission resource corresponding to first initial transmission for the transmission block from among the determined plurality of uplink transmission resources, when the first initial transmission is cancelled, identify a second uplink transmission resource corresponding to second initial transmission for the transmission block based on uplink transmission resource candidates following the identified first uplink transmission resource from among the determined plurality of uplink transmission resources, and perform the second initial transmission through the identified second uplink transmission resource through the transceiver.

According to an embodiment, a redundancy version corresponding to the identified first uplink transmission resource may be set to zero.

According to an embodiment, the second uplink transmission resource may include an uplink transmission resource immediately following the first uplink transmission resource.

According to an embodiment, a redundancy version corresponding to the uplink transmission resource immediately following the first uplink transmission resource may be set to non-zero.

According to an embodiment, the second uplink transmission resource may include a first uplink transmission resource from among one or more uplink transmission resources whose redundancy version is set to zero from among the uplink transmission resource candidates.

According to an embodiment, the first initial transmission may be cancelled by at least one of an uplink transmission cancellation indicator or a slot format indicator.

According to an embodiment, the first initial transmission may be cancelled when at least one of symbols included in the first uplink transmission resource is indicated by the slot format indicator as a downlink symbol or a flexible symbol.

In the afore-described embodiments of the present disclosure, elements included in the present disclosure are expressed in a singular or plural form according to the embodiments of the present disclosure. However, the singular or plural form is selected appropriately for a condition provided for convenience of explanation, and the present disclosure is not limited to the singular or plural form. An element expressed in a singular form may include a plurality of elements and elements expressed in a plural form may include a single element.

It should be understood that the embodiments of the present disclosure described herein should be considered in a descriptive sense only and not for purposes of limitation. That is, it will be understood by one of ordinary skill in the art that various changes in form and details may be made in the embodiments of the present disclosure without departing from the spirit and scope of the present disclosure. Also, the embodiments may be combined with each other as required. For example, parts of methods provided by the present disclosure may be combined to operate the base station and the terminal. Also, although the above embodiments have been presented with reference to 5G and NR systems, other modifications based on the technical idea of the embodiments may also be implemented in connection with other systems such as LTE, LTE-A, and LTE-A-Pro systems.

The invention claimed is:

1. A method performed by a terminal in a wireless communication system, the method comprising:
   receiving, from a base station, configuration information associated with a redundancy version (RV) pattern to be applied to a transport block repetition for configured grant-based uplink transmissions;
   identifying a first uplink transmission resource for first initial transmission of the transport block repetition, based on the RV pattern, the first uplink transmission resource corresponding to an RV of zero;
   in case that the first initial transmission associated with the first uplink transmission resource corresponding to the RV of zero is cancelled, identifying a second uplink transmission resource for a second initial transmission of the transport block repetition, wherein the second uplink transmission resource follows the first uplink transmission resource in a time domain, and wherein the second uplink transmission resource corresponds to an RV of zero or non-zero; and
   performing the configured grant-based uplink transmissions related to the transport block repetition, based on the second uplink transmission resource.

2. The method of claim 1, wherein the second uplink transmission resource comprises an uplink transmission resource immediately following the first uplink transmission resource.

3. The method of claim 2, wherein a redundancy version corresponding to the uplink transmission resource immediately following the first uplink transmission resource is set to non-zero.

4. The method of claim 1, wherein the second uplink transmission resource comprises a first uplink transmission resource with a redundancy version set to zero.

5. The method of claim 1, wherein the first initial transmission is cancelled by an uplink transmission cancellation indicator.

6. The method of claim 1, wherein the first initial transmission is cancelled when at least one of symbols included in the first uplink transmission resource is indicated as a downlink symbol or a flexible symbol by a slot format indicator.

7. The method of claim 1, wherein the first initial transmission is cancelled when at least one symbol included in the first uplink transmission resource overlaps at least one symbol of an uplink transmission resource based on scheduling information for uplink data.

8. A terminal in a wireless communication system, the terminal comprising:
- a transceiver; and
- at least one processor coupled with the transceiver and configured to;
- receive, from a base station, configuration information associated with a redundancy version (RV) pattern to be applied to a transport block repetition for configured grant-based uplink transmissions,
- identify a first uplink transmission resource for first initial transmission of the transport block repetition, based on the RV pattern, the first uplink transmission resource corresponding to an RV of zero,
- in case that the first initial transmission associated with the first uplink transmission resource corresponding to the RV of zero is cancelled, identify a second uplink transmission resource for a second initial transmission of the transport block repetition, wherein the second uplink transmission resource follows the first uplink transmission resource in a time domain, and wherein of the second uplink transmission resource corresponds to an RV of zero or non-zero, and
- perform the configured grant-based uplink transmissions related to the transport block repetition, based on the second uplink transmission resource.

9. The terminal of claim 8, wherein the second uplink transmission resource comprises an uplink transmission resource immediately following the first uplink transmission resource.

10. The terminal of claim 9, wherein a redundancy version corresponding to the uplink transmission resource immediately following the first uplink transmission resource is set to non-zero.

11. The terminal of claim 8, wherein the second uplink transmission resource comprises an uplink transmission resource with a redundancy version set to zero.

12. The terminal of claim 8, wherein the first initial transmission is cancelled by at least one of an uplink transmission cancellation indicator or a slot format indicator.

13. The terminal of claim 12, wherein the first initial transmission is cancelled when at least one of symbols included in the first uplink transmission resource is indicated as a downlink symbol or a flexible symbol by the slot format indicator.

* * * * *